US011167503B2

(12) United States Patent
Bonner et al.

(10) Patent No.: US 11,167,503 B2
(45) Date of Patent: Nov. 9, 2021

(54) HYBRID SELF-REINFORCED COMPOSITE MATERIAL

(71) Applicant: KATHOLIEKE UNIVERSITEIT LEUVEN, Leuven (BE)

(72) Inventors: Mark J. Bonner, Leeds (GB); Larissa Gorbatikh, Tervuren (BE); Peter J. Hine, Leeds (GB); Yentl Swolfs, Minderhout (BE); Ignaas Verpoest, Kessel-Lo (BE); Ian M. Ward, Leeds (GB)

(73) Assignee: KATHOLIEKE UNIVERSITEIT LEUVEN, Leuven (BE)

( * ) Notice: Subject to any disclaimer, the term of this patent is extended or adjusted under 35 U.S.C. 154(b) by 756 days.

(21) Appl. No.: 14/410,169

(22) PCT Filed: Jun. 24, 2013

(86) PCT No.: PCT/EP2013/063172
§ 371 (c)(1),
(2) Date: Dec. 22, 2014

(87) PCT Pub. No.: WO2013/190149
PCT Pub. Date: Dec. 27, 2013

(65) Prior Publication Data
US 2015/0336333 A1 Nov. 26, 2015

(30) Foreign Application Priority Data

Jun. 22, 2012 (GB) .................................... 1211071
Jun. 22, 2012 (GB) .................................... 1211102
(Continued)

(51) Int. Cl.
*B29C 70/04* (2006.01)
*D03D 25/00* (2006.01)
(Continued)

(52) U.S. Cl.
CPC ............ *B29C 70/04* (2013.01); *B29C 70/465* (2013.01); *C08J 5/048* (2013.01); *D03D 25/00* (2013.01);
(Continued)

(58) Field of Classification Search
CPC ........ C08J 5/048; D03D 25/00; Y10T 156/10; Y10T 442/3171
(Continued)

(56) References Cited

U.S. PATENT DOCUMENTS 5,492,580 A * 2/1996 Frank .................... B29C 43/006
156/148
5,856,243 A * 1/1999 Geirhos ................... D04H 3/04
156/306.6
2002/0179271 A1* 12/2002 Lindenfelser ........... B32B 27/12
162/281

FOREIGN PATENT DOCUMENTS

EP 0351201 a2 * 1/1990
EP 0351201 A2 1/1990
(Continued)

OTHER PUBLICATIONS

Swolfs et al., "Interlayer Hybridization of Unidirectional Glass Fibre Composites with Self-Reinforced Polypropylene," 15th European Conference on Composite Materials, Jun. 2012, pp. 24-28, Venice, Italy.
(Continued)

*Primary Examiner* — Vincent Tatesure
(74) *Attorney, Agent, or Firm* — Workman Nydegger

(57) ABSTRACT

The present invention provides novel hybrid self-reinforced composites, combining an oriented brittle fibre and an oriented thermoplastic polymeric ductile fibre (as reinforcement phase) in the same thermoplastic polymeric matrix phase. The hybrid self-reinforced composites are strong and stiff, but in case of impact or crash they have high strain to
(Continued)

failure and absorb a lot of energy. The present invention also relates to methods to produce said hybrid self-reinforced composites by a hot compaction technique.

21 Claims, 14 Drawing Sheets

(30) Foreign Application Priority Data

Jan. 11, 2013 (GB) .................................... 1300461
Jan. 14, 2013 (GB) .................................... 1300594

(51) Int. Cl.
*B29C 70/46* (2006.01)
*C08J 5/04* (2006.01)

(52) U.S. Cl.
CPC ........ *Y10T 156/10* (2015.01); *Y10T 442/3171* (2015.04)

(58) Field of Classification Search
USPC ........................................ 428/292.1; 442/202
See application file for complete search history.

(56) References Cited

FOREIGN PATENT DOCUMENTS

| EP | 2345528 | A2 | 7/2011 | |
|---|---|---|---|---|
| GB | 2253420 | A | 9/1992 | |
| WO | 1998015398 | A1 | 4/1998 | |
| WO | 2007145927 | A1 | 12/2007 | |
| WO | WO-2012103504 | A2 * | 8/2012 | ............. A63B 60/06 |
| WO | 2012146272 | A1 | 11/2012 | |

OTHER PUBLICATIONS

European Office Action from corresponding European Application No. 13 731 329.2, dated Nov. 2, 2016.
Arbter et al., "Experimental Determination of the Permeability of Textiles: A Benchmark Exercise," Composites: Part A, vol. 42, 2011, pp. 1157-1168.
European Office Action from EP Application No. 13731329.2, dated Jun. 29, 2017.
Capiati et al., "The Concept of One Polymer Composites Modelled with High Density Polyethylene," Journal of Materials Science, 1975, pp. 1671-1677, vol. 10.
Fabich et al., "Toughness Improvement in Hybrid Composites Made of Carbon Fibre Reinforced Polypropylene and Self-Reinforced Polypropylene," Texcomp 10: Recent Advances in Textile composites, Proceedings of the 10th International Conference on Textile Composites, Jan. 1, 2010, pp. 3-11.
Foster et al., "The Incorporation of Carbon Nanofibres to Enhance the Interlayer Adhesion of Hot Compacted Single-Polymer Polypropylene Composites," Polymer, Mar. 2, 2010, pp. 1140-1146, vol. 51, No. 5.
International Search Report for corresponding International PCT Application No. PCT/EP2013/063172, dated Oct. 1, 2013.
Kuan et al., "The Mechanical Properties of Hybrid Composites Based on Self-Reinforced Polypropylene," Malaysian Polymer Journal, 2009, pp. 71-80, vol. 4, No. 2.
Taketa et al.,"Interply Hybrid Composites with Carbon Fiber Reinforced Polypropylene and Self-Reinforced Polypropylene," Composites Part A: Applied Science and Manufacturing, Aug. 1, 2010, pp. 927-932, vol. 41, No. 8.
Ustarroz et al.,"Carbon/PP Composites and Carbon/Selfreinforced PP Composites," 17th International Conference on Composite Materials, Jul. 27, 2009, pp. 1-10.
Ward et al., "The Science and Technology of Hot Compaction," Polymer, 2004, pp. 1413-1427, vol. 45.

* cited by examiner

HYBRID SELF-REINFORCED COMPOSITE MATERIAL

FIELD OF THE INVENTION

The present invention relates to hybrid self-reinforced composite materials, and methods of making and using said composite materials, as well as to products comprising such hybrid self-reinforced composite materials.

BACKGROUND OF THE INVENTION

A composite is a combination of a fibre and a matrix. The ideal objective for any composite designer is to have available a material that combines high stiffness/strength with high toughness/extensibility. In general, however, these two types of behaviour are mutually exclusive. Traditional carbon fibre composites deliver exceptional stiffness and strength but can often have a limited extensibility and poor damage tolerance especially at lower operating temperatures (vehicles need to maintain their integrity and crash performance at −40° C.) (with failure strains limited to a few percent, in line with the failure strain of the carbon fibre). On the other hand, the development of self-reinforced composites over the last 20 years has seen the emergence of a new material that is light weight and has exceptional toughness even at low temperatures.

Self-reinforced composites, also referred to as self-reinforced composites (or SRCs in short) are composites where the fibre and matrix are made out of the same polymer. Capiati & Porter [Capiati, N. J.; Porter, R. S., Journal of Materials Science, 1975, 10, 1671] combined drawn polyethylene fibres with a polyethylene matrix with a lower melting point. This allowed them to impregnate the polyethylene fibres without melting them. While there are a number of published methods for producing self-reinforced polymer composites (for example film stacking, powder impregnation and bicomponent tapes), another alternative process for producing such composites is the hot compaction process [Ward, I. M.; Hine, P. J., Polymer, 2004, 45, 1413; GB2253420]. The underlying principle is to take assemblies of oriented single-component polymer fibres or tapes, and expose them to the right temperature, pressure and time conditions, such that a thin skin on the surface of each oriented element is 'selectively melted'. On subsequent fast cooling, the melted material recrystallises to form the matrix phase of a self-reinforced polymer composite, with the remaining fraction of the original oriented phase acting as the reinforcement. The virtues of this technique are that the matrix phase is produced around each fibre, negating the need for infiltration. This avoids impregnation problems, as the matrix is created in situ. In addition, molecular continuity is achieved between the two components of the final composite, which gives a very strong bond between the two phases. Research has shown this to work with a wide range of oriented thermoplastic fibres and tapes including polyethylene, polypropylene, polyester and nylon.

Self-reinforced polypropylene (SRPP), particularly when made by the hot compaction process, has the biggest potential, mainly due to its low price, low density, high toughness and broad processing window. Heavily drawn polypropylene (PP) tapes are used, with a stiffness of about 10 GPa, a strength of 500-600 MPa and a failure strain of 10-15% (see e.g. [Ward, I. M.; Hine, P. J., Polymer, 2004, 45, 1413]). The combination of the high stiffness and strength of the fibres, the ductility of the recrystallized matrix and the perfect fibre-matrix bonding results in a very high toughness, both in terms of failure strain (20%) and impact resistance (notched Izod impact strength of 4750 J/m) (see e.g. www.curvonline.com).

However, for more widespread application in structural parts, SRPP has one major disadvantage: the stiffness of the compacted weaves is low (3-5 GPa, see [Ward, I. M.; Hine, P. J., Polymer, 2004, 45, 1413]) compared to glass and carbon fibre composites (20-80 GPa).

Accordingly, in general, self-reinforced composites are very tough materials, but they lack stiffness. Classic fibre-reinforced composites on the other hand are very stiff materials, but they lack toughness. Most polymer composites are either tough but compliant or stiff but brittle.

When a second type of fibre is added to the composite, this is called hybridizing. Many reports deal with the properties and production of a three component hybrid composite, i.e. a brittle fibre, a ductile fibre and a third matrix phase (of a different material than the fibres). The resulting properties of the hybrid composite are not easy to deduce. Sometimes they follow the rule of mixtures (i.e. the properties of the hybrid composite material can be estimated based on the assumption that a composite property is the volume weighed average of the properties of the components). However, deviations from the rule of mixtures have been reported as well. In this respect, a positive or negative deviation of a property from the rule of mixture is defined as a positive or negative hybrid effect. The term hybrid effect has been used to describe the phenomenon of an apparent (positive or negative) synergistic effect in the properties of a composite containing two or more types of fibre.

Few reports deal with the hybridization of self-reinforced composites. These studies generally have looked at combining discrete layers of a prepreg composite and a self-reinforced polymer (SRP) sheet, in casu self-reinforced polypropylene (SRPP). Taketa et al. [Taketa et al, Composites Part A: Applied Science and Manufacturing, 2010, 41, 927] used a pre-impregnated carbon fibre weave, with an areal density of the fabric is 285 g/m². Fabich et al. [Fabich et al (2010). Toughness Improvement in Hybrid Composites Made of Carbon Fibre Reinforced Polypropylene and Self-Reinforced Polypropylene. Lancaster: Destech Publications, Inc.] used a unidirectional carbon fibre prepreg of 0.25 mm. The research of Kuan et al. [Kuan et al. Malaysian Polymer Journal, 2009, 4, 71] used unidirectional glass fibre polypropylene (GFPP) prepreg, but does not specify any other details of the prepreg. Only Kuan et al. show tensile curves of the hybrid SRPP. The failure strain of the glass fibre layers are clearly lower in the hybrids, demonstrating that Kuan et al. found a negative hybrid effect for failure strain.

The above shows that there is still a need in the art to have available a material that combines high stiffness/strength with high toughness/extensibility.

SUMMARY OF THE INVENTION

It is an object of the present invention to provide good hybrid self-reinforced composite materials, as well as to provide good methods for manufacturing these and products comprising such hybrid self-reinforced composite materials.

It is an advantage of embodiments of the present invention that composite materials are provided that substantially maintain the ductile character of the composite material, even if failure of the brittle fibres occurs. Such an advantage is obtained by embodiments of the present invention by using a material comprising ductile fibres and brittle fibres configured in one of three configurations (i.e. an interlayer configuration, an intralayer configuration or an intrayarn configuration) providing alternative solutions for maintaining the ductile character of the composite material even if failure of the brittle fibres occurs.

The above objective is accomplished by a method and device according to the present invention.

The present invention relates to a fibrous self-reinforced composite (SRC) material comprising
(i) a thermoplastic polymer as matrix phase, and a reinforcement phase comprising
(ii) a first oriented polymeric ductile fibre having the same type as the matrix phase and
(iii) a second high stiffness, brittle fibre, wherein said brittle fibres make up less than 30 vol % of the composite material and
wherein said brittle fibres are highly dispersed within said composite material by
the ductile fibres and the brittle fibres being organised in an intralayer configuration, and/or
the ductile fibres and the brittle fibres being organised in an interlayer configuration wherein alternatingly a layer of ductile fibres and a layer of brittle fibres is introduced and wherein the thickness of the layer of brittle fibres is smaller than 125 µm times the square root of (230 GPa/stiffness of the brittle fibre), and/or
the ductile fibres and the brittle fibres being organised in an intrayarn configuration.

The ductile fibres and the brittle fibres may be organised in an intralayer configuration.

The intralayer configuration may comprise within at least one layer, at least a plurality of brittle fibres are introduced in substantially parallel bands, the substantially parallel bands being spaced from each other.

The spacing between parallel bands in the layer may be larger than the average width of the parallel bands. The spacing between parallel bands may be larger than twice the average width of the parallel bands.

The spacing between parallel bands in the layer may be at least 5 mm.

The brittle fibres may be present in a first set of parallel bands according to a first orientation and the ductile fibres may be present in a second set of parallel bands according to a second orientation, perpendicular to the first orientation.

Within at least one layer the brittle fibres may be configured in woven bands.

In at least one layer at least one the brittle fibres may be configured in a third set of parallel bands and the ductile fibres are present in a fourth set of parallel bands, the third set of parallel bands and the fourth set of parallel bands having the same orientation.

The ductile fibres and the brittle fibres may be organised in an interlayer configuration wherein alternatingly a layer of ductile fibres and a layer of brittle fibres is introduced and wherein the thickness of the layer of brittle fibres is smaller than 125 µm times the square root of the ratio (230 GPa/stiffness of the brittle fibre).

The thickness of the layers of brittle fibres may be less than 125 µm.

The ductile fibres and the brittle fibres may be organised in an intrayarn configuration.

The brittle fibres may be highly dispersed such that the composite material has at least twice the stiffness, substantially a same or higher strength and at least 0.8 times the failure strain of a self-reinforced composite reference material having no brittle fibres but further having the same composition as the fibrous self-reinforced composite material.

Said ductile fibre may have a failure strain of at least 8% and wherein said brittle fibre has a failure strain of less than 4%.

Said composite material may have a stiffness of at least 10 GPa, a tensile strength of at least 100 MPa, e.g. at least 120 MPa, in some embodiments at least 250 MPa, and an impact (Izod) strength of at least 2500 J/m.

The matrix phase may be produced by hot compaction.

The matrix phase may be produced by selectively melting a fraction of the surface of each oriented polymer element.

Said ductile fibre may be a thermoplastic polyolefin, such as PP or PE, or a thermoplastic polyester, or a thermoplastic polyamide.

Said brittle fibre may be any of a carbon, glass or natural fibre such as for example flax fibre.

Said brittle fibres may be uniformly distributed within said composite material.

The present invention also relates to a method for manufacturing a fibrous self-reinforced composite material, the method comprising providing a thermoplastic polymer as matrix phase, and a reinforcement phase comprising a first oriented polymeric ductile fibre having the same type as the matrix phase and a second high stiffness, brittle fibre, wherein said brittle fibres make up less than 30 vol % of the composite material, wherein said providing comprises providing said brittle fibres in a highly dispersed within said composite material by
organising the ductile fibres and the brittle fibres in an intralayer configuration, or
organising the ductile fibres and the brittle fibres in an interlayer configuration wherein alternatingly a layer of ductile fibres and a layer of brittle fibres is introduced and wherein the thickness of the layer of brittle fibres is smaller than 125 µm×square root of (230 Gpa/stiffness of the brittle fibre), or
organising the ductile fibres and the brittle fibres in an intrayarn configuration.

Providing may comprise the steps of (a) making an assembly of brittle and polymeric ductile fibres and (b) subjecting said assembly to a hot compaction step.

The method may comprise maintaining the temperature of the assembly during said hot compaction step within a melting range of the polymer fibres as measured by differential scanning calorimetry.

The present invention also relates to a product comprising a fibrous self-reinforced composite (SRC) material as described above.

The present invention also relates to a fibrous self-reinforced composite material manufactured using a method as described above.

In one aspect, the present invention also relates to a fibrous self-reinforced composite (SRC) material comprising
(i) a thermoplastic polymer as matrix phase, and a reinforcement phase comprising
(ii) a first oriented polymeric ductile fibre having the same type as the matrix phase and
(iii) a second high stiffness, brittle fibre, wherein said brittle fibres make up less than 30 vol % of the composite material and wherein said brittle fibres are highly dispersed within said composite material such that the composite material has at least twice the stiffness, substantially a same or higher strength and at least 0.8 times the failure strain of a self-reinforced composite reference material having no brittle fibres but further having the same composition as the fibrous self-reinforced composite material.

The present invention also relates to a fibrous self-reinforced composite (SRC) material comprising
(i) a thermoplastic polymer as matrix phase, and a reinforcement phase comprising
(ii) a first oriented polymeric ductile fibre having the same type as the matrix phase and
(iii) a second high stiffness, brittle fibre, wherein said brittle fibres make up less than 30 vol % of the composite material and
wherein said brittle fibres are highly dispersed within said composite material by organising the ductile fibres and the brittle fibres in an intralayer configuration.

The present invention furthermore relates to a fibrous self-reinforced composite (SRC) material comprising
(i) a thermoplastic polymer as matrix phase, and a reinforcement phase comprising
(ii) a first oriented polymeric ductile fibre having the same type as the matrix phase and
(iii) a second high stiffness, brittle fibre, wherein said brittle fibres make up less than 30 vol % of the composite material and
wherein said brittle fibres are highly dispersed within said composite material by organising the ductile fibres and the brittle fibres in an interlayer configuration wherein alternatingly a layer of ductile fibres and a layer of brittle fibres is introduced and wherein the thickness of the layer of brittle fibres is smaller than 125 μm×the square root of the ratio (230 Gpa/stiffness of the brittle fibre).

The present invention also relates to a fibrous self-reinforced composite (SRC) material comprising
(i) a thermoplastic polymer as matrix phase, and a reinforcement phase comprising
(ii) a first oriented polymeric ductile fibre having the same type as the matrix phase and
(iii) a second high stiffness, brittle fibre, wherein said brittle fibres make up less than 30 vol % of the composite material and
wherein said brittle fibres are highly dispersed within said composite material by organising the ductile fibres and the brittle fibres in an intrayarn configuration.

The present invention furthermore relates to a process for manufacturing a fibrous self-reinforced composite material comprising the steps of (i) making an assembly of brittle and polymeric ductile fibres and (ii) subjecting said assembly to a hot compaction step.

The temperature at which the assembly is maintained may be within the melting range of the polymer fibres as measured by differential scanning calorimetry.

More in particular, the temperature at which the assembly is maintained is a temperature between the onset of the melting endotherm and the end of the melting endotherm of a constrained oriented polymer fibre or tape as measured by DSC.

The present invention also relates to a hybrid self-reinforced composite materials having improved tensile and/or flexural properties comprising (i) a thermoplastic polymer as matrix phase, and a reinforcement phase comprising (ii) an oriented polymeric ductile fibre having the same type as the matrix phase and having a failure strain of at least 8%; and (iii) a(n) (oriented) high stiffness, brittle fibre having a failure strain of less than 4%, wherein said brittle fibres make up less than 30 vol % of the composite material and wherein said brittle fibres are highly dispersed within said composite material.

The fibrous self-reinforced composite material according to the present invention has a stiffness of at least 6 Gpa such as for example at least 10 Gpa, a tensile strength of at least 100 MPa, e.g. at least 120 MPa or at least 250 MPa, and an impact (Izod) of at least 2500 J/m.

In one embodiment the brittle and ductile fibres in said fibrous self-reinforced composite material are organised in an interlayer configuration wherein the thickness of the layers is less than 125 μm times the square root of the ratio (230 GPa/stiffness of the brittle fibre). In some embodiments the thickness of the layer may be smaller than 200 μm, preferably less than 150 μm or less than 100 μm.

In another embodiment the brittle and ductile fibres in said fibrous self-reinforced composite material are organised in an intralayer configuration.

In yet another embodiment the brittle and ductile fibres in said fibrous self-reinforced composite material are organised in an intrayarn configuration. Said commingled yarns may in its turn be present in a fabric, film or mat.

Preferably, said ductile fibre is made up of a thermoplastic polyolefin, such as PP or PE, a thermoplastic polyester, or a thermoplastic polyamide. Preferably, said brittle fibre is a carbon, glass or a natural fibre such as for example flax fibre.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

BRIEF DESCRIPTION OF THE DRAWINGS

FIG. 1b illustrates an interlayer or layer-by-layer or interplay configuration, FIG. 1a (ii) and FIG. 1c illustrates an intralayer or cowoven configuration, and FIG. 1a (iii) and FIG. 1d illustrates an intrayarn or commingled configuration, according to an embodiment of the present invention.

Figure 1A:
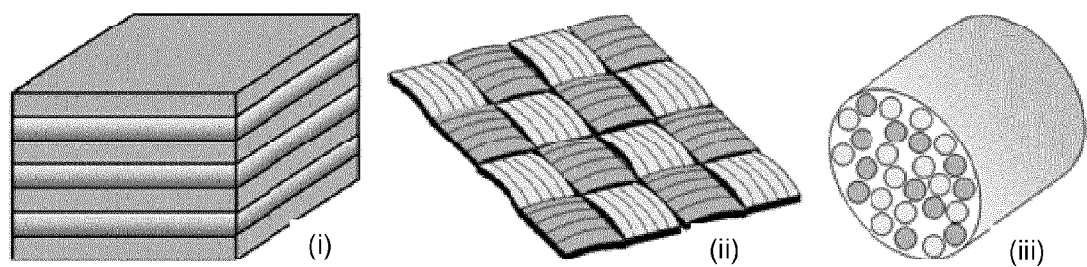
FIG. 1a to FIG. 1d schematically represents different hybridization configurations, wherein FIG. 1a (i)

The drawings are only schematic and are non-limiting. In the drawings, the size of some of the elements may be exaggerated and not drawn on scale for illustrative purposes.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Figure 1B:
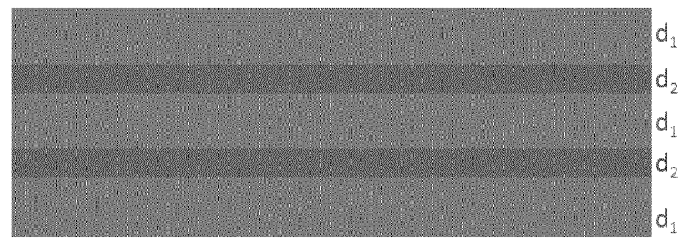
Figure 1C:
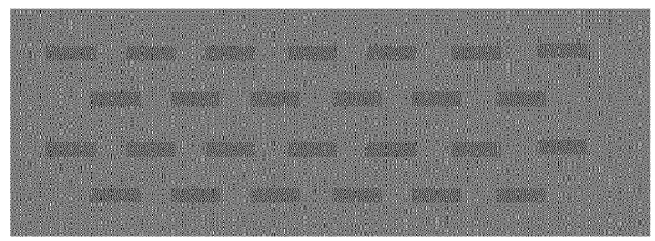
Figure 1D:
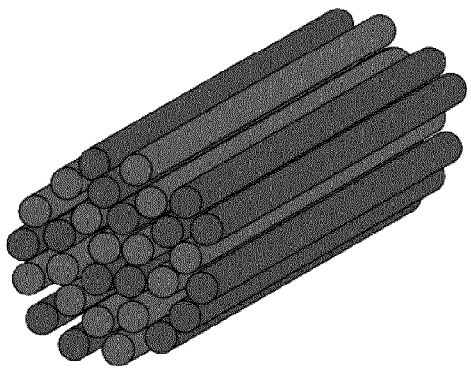

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in embodiments of the present invention reference is made to dispersion reference is not made to chemical dispersion, but to the spread of material in the configuration as discussed for the different configurations considered below.

Where in embodiments of the present invention reference is made to an interlayer configuration, reference is made to a configuration wherein layers with a different composition are stacked. Such layers may be arranged alternatingly. Such a configuration also may be referred to as layer-by-layer configuration or interplay configuration. By way of illustration, an example thereof is shown in FIG. 1a (i) and in FIG. 1b. According to at least some embodiments of the present invention such a configuration typically comprises alternatingly a layer comprising ductile fibres and a layer comprising brittle fibres. Where reference is made to a highly dispersed configuration for the brittle fibres in this configuration, typically reference is made to a situation wherein the layers comprising brittle fibres are dispersed in the layers comprising ductile fibres. Advantageously, for having a high degree of dispersion, the thickness of the layer comprising brittle fibres is small. The inverse of the thickness of the layer comprising brittle fibres, or the average thereof if it varies over different layers, may be used as a measure for the degree wherein the configuration is considered dispersed. With reference to FIG. 1b, a measure for the degree of dispersion thus may be given by 1/d2, with d2 being the thickness of the layer comprising brittle fibres.

Where in embodiments of the present invention reference is made to an intralayer configuration, reference is made to a configuration wherein within a same layer, portions such as for example bands, with different composition may occur. By way of illustration, an example thereof is shown in FIG. 1a (ii) and FIG. 1c. Where in this configuration reference is made to highly dispersed configuration reference is made to the degree of dispersion of bands within a layer. Typically, such a layer may exist of portions comprising and the degree of dispersion for the brittle fibres may be expressed by the inverse of the distance between the portions in the layer comprising brittle fibres. In some embodiments, in an intralayer configuration, different portions such as e.g. bands may be woven with respect to each other. In some embodiments having an intralayer configuration, portions, e.g. bands, comprising fibres of a first type may be arranged so that they have a first orientation and portions, e.g. bands, comprising fibres of a second type may be arranged so that they have a second orientation substantially parallel.

Where in embodiments of the present invention reference is made to an intrayarn configuration, reference is made to a configuration wherein a yarn is a bundle of fibres whereby brittle and ductile ductile fibres are intermingled within the yarn. Using traditional composite performing techniques result in fibres being present in different directions. An example of such a configuration is shown in FIG. 1a(iii) and in FIG. 1d. A measure for the degree of dispersion may be the average distance between a fibre and its shortest neighbour.

The above configurations illustrate the basic configurations for the alternative solutions that could be used according to embodiments of the present invention. It nevertheless is to be noticed that also a combination of different solutions is within the scope of the present invention.

Where in embodiments or the claims of the present invention reference is made to a self-reinforced composite, reference may equally be made to self-reinforced polymer, single polymer composite or all polymer composite.

Where in embodiments of the present invention reference is made to a polymer fibre having the same type as the matrix phase, reference may be made to a polymer that has the same composition or to a polymer of the same type but not necessarily of the same grade, such as e.g. a copolymer.

Where in embodiments of the present invention reference is made to a polymer element, reference is made to a polymer fibre or polymer tape.

Unidirectional or uniaxial composites have all fibres oriented in the same direction. They can be produced by an interlayer or intrayarn strategy. In contrast, in multidirectional composites the fibres are oriented in at least two directions (e.g. 0° and 90°, but other orientations are known in the art as well). Multidirectional composites can be produced in three ways: (a) 'UD cross ply' in which all the fibres of one layer are in the same direction, while the fibres of a different layer are in a different direction (e.g. the unidirectional layers lie in various 0° and 90°); (b) using woven material; (c) using an 'intralayer' strategy.

Where in embodiments of the present invention reference is made to a high stiffness, brittle fibre, reference is made to a brittle fibre having a longitudinal tensile modulus of 30 GPa or higher.

In a first aspect, the present invention is based on the finding that selected hybrid self-reinforced composite materials comprising (i) a thermoplastic polymer matrix, (ii) (oriented) polymeric ductile fibres of the same material as the matrix; and (iii) (oriented) high stiffness, brittle fibres, can provide improved properties over the prior art. According to some embodiments of the present invention, even at low concentrations of such brittle fibres in the hybrid self-reinforced composite, e.g. at a concentration less than 30 vol % of the composite material, these brittle fibres can contribute significantly to improved tensile and/or flexural properties and/or impact strength of the hybrid composite materials when the brittle fibres are well dispersed within the composite. Advantageously, the brittle fibres are well mixed with the ductile fibres and/or are provided in such a manner that there is good adhesion between the brittle fibres and the matrix material.

Therefore, embodiments of the present invention relate to a fibrous self-reinforced composite (SRC) material comprising a thermoplastic polymer as matrix phase, and a reinforcement phase. The reinforcement phase comprises a first oriented polymeric ductile fibre having the same type as the matrix phase and a second high stiffness, brittle fibre, wherein said brittle fibres make up less than 30 vol % of the composite material. Furthermore, according to embodiments of the present invention, the brittle fibres are highly dispersed within said composite material. The latter is obtained by providing the ductile fibres and the brittle fibres in an intralayer configuration, and/or in an interlayer configuration wherein alternatingly a layer of ductile fibres and a layer of brittle fibres is introduced and wherein the thickness of the layer of brittle fibres is smaller than 125 μm times the square root of the ratio (230 GPa/stiffness of the brittle fibre), and/or in an intrayarn configuration.

Without being bound by theory, when brittle and ductile fibres are well mixed, the breaking or damaging of the brittle fibre has less impact on the properties of the composite material, and the residual strength and load bearing capacity of the composite after failure of the brittle fibre is increased. A similar effect also may be obtained by inducing a good adhesion between the brittle fibres and the matrix, e.g. by making the composite through hot compaction.

The combination of an oriented brittle and an oriented thermoplastic ductile fibre in hybrid self-reinforced composites allows for a dual behaviour. In regular use, the hybrid self-reinforced composite is both strong and stiff. In case of impact or crash, the hybrid self-reinforced composite still behaves ductile and absorbs a lot of energy. This dual behaviour is especially interesting in structural applications, where impact absorption is important. This makes the automotive industry a key customer for hybrid SRCs. Also, these hybrid SRCs can be used in high volume applications, like again the automotive industry. Because hybrid SRCs are thermoplastic instead of thermoset, they do not require a curing time. Moreover, because the matrix can be created in situ, the classic problem of thermoplastic composites, namely the impregnation, can be avoided.

According to embodiments of the present invention, the terms "polymeric ductile fibre" or "ductile fibre" is used herein in a broad sense to denote strands comprising a thermoplastic polymer, however formed, with a failure strain of at least 8%, e.g. at least 9% or e.g. at least 10%. The ductile fibres may be non-woven fibres laid in a web, or may be comprised within yarns, or constituted by bands or fibrillated tapes, for example formed by slitting films, depending on the configuration. If comprised within yarns or constituted by bands or fibrillated tapes, those yarns, bands or fibrillated tapes may be laid together or they may be formed into a fabric, for example by weaving or knitting. Suitably, the fibres used in the process of the invention are formed from molten polymer, for example as melt spun filaments. However, the oriented polymer fibres may be obtained by any of the known manufacturing processes (e.g. melt spinning and drawing and gel spinning and drawing). Typically, such fibres may have a diameter in the range 0.005 to 0.05 mm. In one embodiment, said yarns, bands, fibrillated tapes or fabric comprise said brittle fibre as well, e.g. in the intrayarn configuration.

In the context of the present invention the polymeric material that make up the ductile fibre and the matrix phase in the hybrid composites, is a thermoplastic polymer, such as a thermoplastic polyolefin. The polyolefin polymer includes polyethylene, polypropylene or polybutylene, or copolymers comprising at least one of those olefin polymers. The polyolefin polymer may be a polypropylene homopolymer or a copolymer containing a major proportion of polypropylene. Advantageously, it may be a polyethylene homopolymer or a copolymer containing a major proportion of polyethylene.

Other classes of polymeric ductile fibres which may be used in embodiments of the present invention include any of the known orientable polymers. In particular the oriented polymer may be an unsubstituted or mono- or poly-halo-substituted vinyl polymer, an unsubstituted or hydroxy-substituted polyester, a polyamide, a polyetherketone or a polyacetal. Suitable examples include vinyl chloride polymers, vinyl fluoride or vinylidene fluoride polymers PHB, PEEK and homo- and copolymers of polyoxymethylene.

In the context of the present invention the high stiffness, brittle fibre has a failure strain of less than 4%, more preferably less than 3.5% or 3%, such as less than 2.5% or 2%. Suitable brittle fibres include but are not limited to carbon fibre, glass fibre, or natural fibre such as for example flax fibre, hemp, basalt, jute, and the like. Preferably said brittle fibre is a carbon fibre. Preferably said brittle fibre has a stiffness of at least 30 GPa, preferably at least 40 GPa.

Preferably, the (ductile and/or brittle) fibres used in the present invention are continuous fibres or fibres with an aspect ratio of at least 100. In the context of embodiments of the present invention the brittle fibre content of the hybrid composite is less than 30 vol % or 25 vol %, preferably less than 20 vol % or 15 vol %, more preferably less than 12 vol %, 10 vol %, or 8 vol %, such as less than 6, 5 or 4 vol %.

In the context of embodiments of the present invention the brittle fibre content of the hybrid composite may range between 0.5 vol % and 30 vol %, such as between 0.5 vol % and 25 vol %, preferably ranges between 1 vol % and 20 vol %, such as between 1 vol % and 18 vol %, more preferably ranges between 1 vol % and 15 vol % or between 2 vol % and 15 vol %, even more preferably between 2 vol % and 12 vol % or between 2.5 vol % and 10 vol %, even more preferably ranges between 3 vol % and 8 vol %.

The degree of dispersion is a measure for the mixture intensity of fibres, e.g. two fibres, and is useful to evaluate the dispersion of the brittle fibres in the polymeric matrix. As indicated above, the degree of dispersion may be defined differently for different configurations. A high degree of dispersion can thus be obtained in different ways depending on the hybridization configuration. In laminated composites a measure for the degree of dispersion can be defined as the reciprocal of the smallest repeat unit of the laminate. In intralayer configurations, a measure for the degree of dispersion may be a reciprocal distance between two different portions comprising such fibres and in intrayarn a measure for the degree of dispersion may be a reciprocal (e.g. average) distance between fibres.

Alternatively, the degree of dispersion can be evaluated by measuring the average fibre to fibre distance using image analysis. The closer the average (measured) (brittle) fibre to (brittle) fibre distance is to the (theoretical) predicted fibre to fibre separation, calculated based on the (brittle) fibre volume fraction, the better the degree of dispersion of said fibre is within the composite. A higher degree of dispersion means that the constituents are more finely mixed or occur in thin layers. In particular, a high degree of dispersion can also be obtained when the same polymer occurs throughout the hybrid, e.g. when both the brittle and the ductile fibres occur in all the layers that make up the composite. By way of illustration, embodiments of the present invention not being limited thereto, different embodiments of the present invention will now be discussed in somewhat more detail.

A first specific embodiment of the present provides a fibrous self-reinforced composite material comprising (i) a thermoplastic polymer matrix, (ii) an oriented polymeric ductile fibre made up of said thermoplastic polymer and (iii) a brittle fibre, wherein the brittle fibres make up less than 30 vol %, preferably less than 25 vol %, 20 vol % or 15 vol %, of the composite material and wherein the brittle and the ductile fibres are organised in an interlayer configuration. Preferably, the thickness of the layers is less than 125 μm times the square root of the ratio (230 GPa/stiffness of the brittle fibre). E.g. for carbon fibres, the width of the layers advantageously is less than 125 μm or less. Depending on the fibres used, the width of the layers may be less than 200 μm or less than 150 μm, preferably less than 125 μm, more preferably less than 100 μm or 80 μm, such as less than 60 μm, 50 μm or 40 μm. It is understood that thinner layers result in a higher degree of dispersion. Without being bound by theory, by using thinner layers, the damage of the brittle fibre has less impact on the self-reinforced layers than with thicker layers. Consequently, this increases the residual strength after the failure of the carbon fibre layers. The interlayer hybrid self-reinforced composite of the present invention may be a unidirectional composite or a multidirectional composite.

A second embodiment of the present provides a fibrous self-reinforced composite material comprising (i) a thermoplastic polymer matrix, (ii) an oriented polymeric ductile fibre made up of said thermoplastic polymer and (iii) a brittle fibre, wherein the brittle fibres make up less than 30 vol %, preferably less than 25 vol %, 20 vol % or 15 vol %, of the composite material and wherein the brittle and the ductile fibres are organised in an intralayer configuration. In one embodiment, the intralayer hybrid self-reinforced composite may be a multidirectional composite, although embodiments are not limited thereto as described above and as shown in the examples. The brittle fibres may be oriented in one or in more than one directions, e.g. in the weft or warp direction or both. Preferably, the thickness of each layer is less than 125 µm times the square root of the ratio (230 GPa/stiffness of the brittle fibre). For carbon fibres, the thickness may e.g. advantageously be less than 125 µm. In some other embodiments for other types of fibres, the thickness may be less than 200 µm or less than 150 µm, preferably less than 125 µm, more preferably less than 100 µm or 80 µm, or even less than 60 µm, 50 µm or 40 µm.

Optionally, an interleaved film may be present between the layers in an inter- or intralayer configuration, e.g. to influence the adhesion between the matrix and the brittle fibre. Such an interleaved film may be made up of the same material as the matrix phase or a derivative thereof, but may alternatively also be of a different type or different polymer than the matrix phase. Further examples of features that may occur in intralayer configurations can also be seen in the examples discussed further down in this description.

A third embodiment of the present invention provides a fibrous self-reinforced composite material comprising (i) a thermoplastic polymer matrix, (ii) an oriented polymeric ductile fibre made up of said thermoplastic polymer and (iii) a brittle fibre, wherein the brittle fibres make up less than 30 vol %, preferably less than 25 vol %, 20 vol % or 15 vol % of the composite material and wherein the brittle and the ductile fibres are organised in an intrayarn configuration. The intrayarn hybrid self-reinforced composite according to an embodiment of the present invention can be a unidirectional or a multidirectional composite. The commingled yarns can be organised as a parallel multifilament strip or film, or as a fabric or mat, either woven, non-woven or braided. Said fibrillated strip or fabric can further be organised according to an inter- or intralayer configuration.

Another specific embodiment of the present invention relates to a hybrid self-reinforced composite, comprising a brittle fibre, preferably carbon, and a self-reinforced polyamide, wherein said brittle fibre makes up less than 30 vol %, preferably less than 25 vol %, 20 vol % or 15 vol % of the composite material, and wherein the fibres are organized in an interlayer, intralayer or intrayarn configuration. Preferably, said brittle fibres are highly dispersed within said composite material. Surprisingly, said hybrid self-reinforced polyamide composite according to an embodiment of the present invention showed improved flexural properties.

Another specific embodiment of the present invention relates to a hybrid self-reinforced thermoplastic polyolefin composite, comprising a brittle fibre, preferably carbon, and a self-reinforced thermoplastic polyolefin, preferably polypropylene or polyethylene, wherein said brittle fibre makes up less than 30 vol %, preferably less than 25 vol %, 20 vol % or 15 vol % of the composite material and wherein the fibres are organized in an interlayer (with layer thickness less than 150 µm or 100 µm), intralayer or intrayarn configuration. Preferably, said hybrid self-reinforced thermoplastic polyolefin composite further comprises an interleaved film of said thermoplastic polyolefin or a derivative thereof, such as a maleic anhydride grafted PP film in a hybrid self-reinforced PP composite.

Advantageously, the hybrid self-reinforced polyamide or polyolefin composite according to an embodiment of the present invention, preferably comprising a carbon fibre, combines the properties of a self-reinforced nylon (e.g. PA6) or polyolefin sheet (i.e. lightweight, outstanding impact performance and strength and producible in high-volume processes) with those of existing carbon fibre reinforced composites, which have outstanding stiffness and strength but low toughness (especially thermosets).

In at least some embodiments, the composite may be characterised by one or more of the following: (i) a stiffness of at least 6 GPa, e.g. at least 8 GPa or 10 GPa, preferably at least 12 or 13 GPa, more preferably a stiffness of at least 15 GPa;

(ii) a tensile strength of at least 250 MPa, preferably at least 300 or 350 MPa, more preferably at least 400 or 450 MPa;

(iii) impact (Izod) of at least 2000 J/m or 2500 J/m, preferably at least 3000 J/m or 3500 J/m, more preferably at least 4000 J/m (iv) Toughness, expressed as the energy to penetration of at least 12 J/mm or 15 J/mm, more preferably at least 18 J/mm.

It is an advantage of at least some embodiments of the present invention that the composite material may have one or more of the following advantages:

The composite material according to an embodiment of the present invention may have at least twice the stiffness, substantially the same or higher strength and at least 0.8 times the failure strain of a composite material not having the brittle fibres but further having the same composition and configuration.

In another aspect, the present invention relates to a method for manufacturing a fibrous self-reinforced composite material. The method may be advantageously be used for manufacturing a fibrous self-reinforced composite material as described in the first aspect, although embodiments of the present invention are not limited thereto. The method according to embodiments of the present invention comprises providing a thermoplastic polymer as matrix phase, and a reinforcement phase comprising a first oriented polymeric ductile fibre having the same type as the matrix phase and a second high stiffness, brittle fibre. The brittle fibres thereby make up less than 30 vol % of the composite material. Said providing comprises, according to embodiments of the present invention, providing said brittle fibres in a highly dispersed within said composite material by organising the ductile fibres and the brittle fibres in an intralayer configuration, and/or organising the ductile fibres and the brittle fibres in an interlayer configuration wherein alternatingly a layer of ductile fibres and a layer of brittle fibres is introduced and wherein the thickness of the layer of brittle fibres is smaller than 125 µm times the square root of the ratio (230 GPa/stiffness of the brittle fibre), and/or organising the ductile fibres and the brittle fibres in an intrayarn configuration.

Methods according to embodiments of the present invention thereby result in hybrid self-reinforced composites having good or improved properties by the introduction of brittle fibres in a highly dispersed manner. Furthermore, according to at least some embodiments of the present invention, the properties of a hybrid self-reinforced composite may also be good or improved by manufacturing them and thereby adjusting the adhesion or bond between the brittle fibres and the polymeric matrix. One embodiment relates to a method to improve the flexural properties of a hybrid self-reinforced composite by taking steps to increase the adhesion between the polymeric matrix and the brittle fibre. Adhesion can be improved by choosing a polymeric material which is more compatible with the brittle fibre used, such as the combination polyamide-carbon fibre. Adhesion between the layers can be improved by adding an interleaved film of the same material as the matrix phase or a derivative of such material, such as using a maleic anhydride grafted PP to improve the PP-carbon fibre adhesion.

Another embodiment relates to a method to improve the tensile properties of a hybrid self-reinforced composite by taking steps to decrease the adhesion between the polymeric matrix and the brittle fibre, such as by choosing a thermoplastic polymeric material which is less compatible with the brittle fibre used (e.g. PP and carbon fibre).

According to some embodiments of the present invention, the method may comprise applying a hot compaction technique, such as for example described in GB2253420 or WO1998015398, although embodiments of the present invention are not limited to the use of such a technique. Preferably, said method of the present invention further may comprise the step of making an assembly of brittle and thermoplastic polymeric ductile fibres, which may include one or more of the following steps: a laminating step, a weaving step (to produce a cloth), a braiding step, . . . .

For most applications of the products of this invention the preferred processes are those that comprises a hot compaction technique which is carried out in a manner which selectively melts from 5 to 10% by weight of the polymer fibre material, or which selectively melts at least 10% by weight of the polymer fibre material, such as from 10 to 20% or 10 to 30% by weight of the polymer or even up to 35, 40, 45 or 50% by weight. Preferably, the hot compaction technique is carried out in a manner (process temperature, pressure & time) allowing the generation of sufficient matrix material by the selective melting of the polymeric fibres to coat all the brittle fibres, while still retaining a significant amount of molecular orientation of said polymeric fibres. The extent of melting relating to a specific processing temperature can easily be evaluated by e.g. Differential Scanning calorimetry (DSC) or Wide Angle X-ray Scattering.

In a preferred embodiment the temperature at which the fibres are compacted is a temperature between the onset of the melting endotherm and end of the melting endotherm of a constrained oriented polymer fibre or tape as measured by DSC. The temperature at which the fibres are compacted is within 20° C., 15° C., 10° C., 8° C., 6° C., 5° C., 4° C. or 3° C. of the peak temperature of melting of the polymeric ductile fibre i.e. the temperature of which the endotherm measured by DSC of the polymer fibres reaches its maximum. The minimum temperature at which the fibres should be contacted is preferably that at which the leading edge of the endotherm of melting of the polymeric fibre extrapolated to zero intersects the temperature axis (onset temperature).

The pressure at which the assembly of fibres is maintained during this stage of the process will be such as to maintain the individual fibres in intimate contact but not such as will compact them and in particular not inhibit the selective melting of the polymer. In general, pressures in the range 0.5 to 5.0 MPa are preferred.

The composite material according to the first aspect or obtained using a method according to the second aspect may advantageously be used for producing devices, such as for examples structural elements, for use in one of the following applications, embodiments of the present invention not being limited thereto:
Automotive—body panels, parcel shelves, under-shields, load floors
Off-road vehicles—high-impact exterior panels
Marine—personal watercraft
Sports—helmets, pads, guards, shoe soles, . . .
Leisure—suitcases, loudspeaker cones
Personnel protective equipment—safety helmets, anti-ballistic shields
Medical—orthoses, temporary supports
Construction—shuttering, formwork
By way of further illustration, embodiments of the present invention not being limited thereto, a number of examples of composite materials are discussed and experimental results thereon are described, these experimental tests illustrating features and advantages of embodiments of the present invention.

Example 1

Multidirectional Hybrid Self-Reinforced CF/PP Composites (Interlayer)

Figure 7:
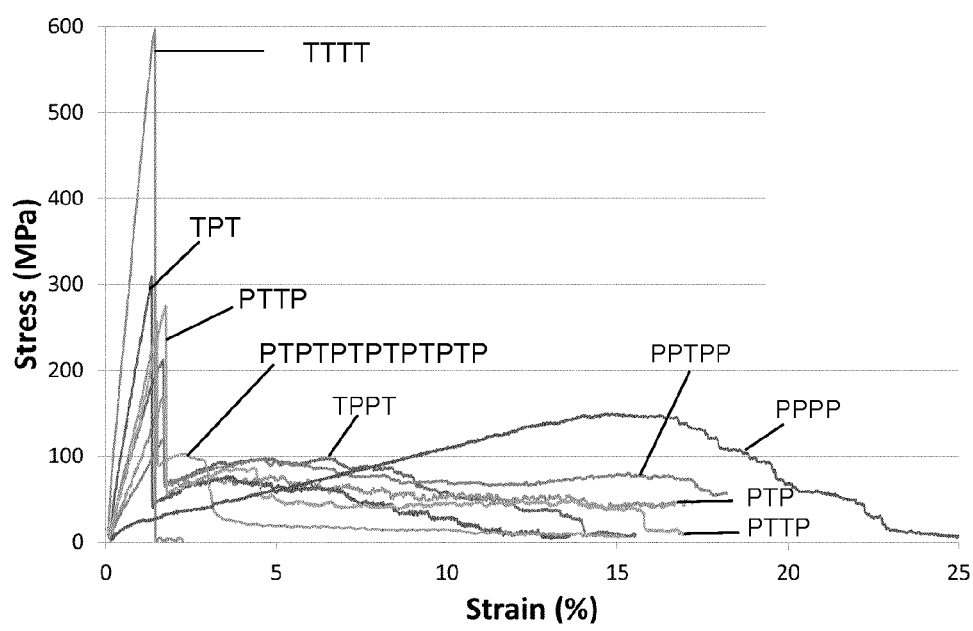
FIG. 7 shows the tensile behaviour of multidirectional interlayer SRPP/CFPP hybrids, thereby illustrating features and advantages of embodiments of the present invention.

Multidirectional hybrid SRPP were produced using weaves of PP tapes. Hence, the hybrids also have fibres transverse to the loading direction. Textreme weaves (Oxeon) were impregnated to form Textreme prepregs (layer thickness of ca. 100 µm) and various lay-ups were made and tested. These layups are indicated by their stacking sequence, where "P" stands for SRPP and "T" for the Textreme prepregs. The tensile curves are shown in FIG. 7. Because of the ductile behaviour after the carbon fibre failure, the area underneath the tensile curve is increased compared to the non-hybrid lay-up TTTT. This means the energy absorbed until tensile failure is increased. This is an indication for an improved impact resistance.

Moreover, the failure strain of the carbon fibres seems to increase. When compared to the TTTT lay-up (ca. 1.5%), the PTP and PPTPP show an increase in failure strain of 18% (ca. 1.8%) and 12% (ca. 1.7%), respectively.

Figure 8:
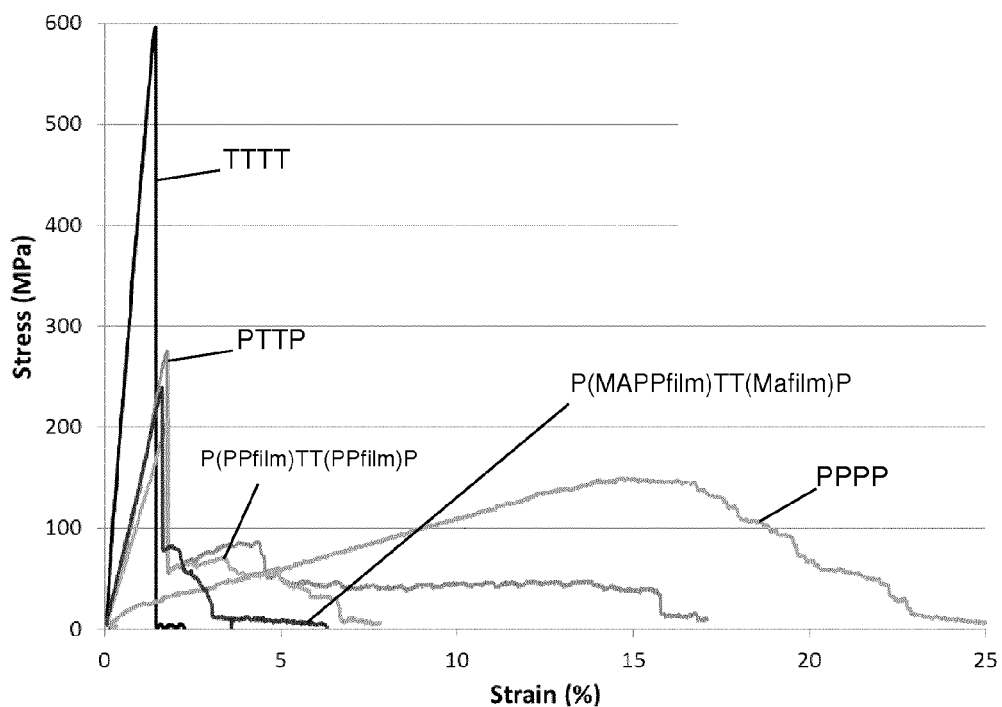
FIG. 8 shows the influence of interleaved films on the tensile behaviour of interlayer CFPP/SRPP hybrids, thus illustrating features and advantages of embodiments of the present invention.

The effect of interleaved films was also investigated for interlayer CFPP/SRPP hybrids. The PTTP lay-up has a low interlayer adhesion. This interlayer adhesion can be increased by adding films in between. This was done by adding PP and MAPP films in between the layers. The tensile results are shown in FIG. 8. The addition of film results in a lower and smaller second part of the curve. The increased interlayer adhesion transfers a bigger part of the damage of the CFPP to the SRPP. Moreover, the delamination has more difficulties in developing over the sample, which results in a localization of the damage. The effect of the interleaved films seems to be more severe for MAPP films, which have an even better adhesion.

Flexural tests were also performed on some layups, i.e. a thin (PTTP) and a thick layup (PTPTPTPTPTP), with and without interleaved films. Addition of the films increases the flexural strength of PTTP from 93 MPa (no film) to ca. 130 MPa (for PP film) or 135 MPa (for MAPP film). The thick layup also shows an, albeit smaller, increase: from ca. 120 MPa (no film) to ca. 140 MPa (for PP film). All these samples failed by delamination of layers and buckling underneath the loading nose. An increased interlayer adhesion by adding films makes the development of these delaminations more difficult. This results in an increased flexural strength. Even with films, the delaminations are responsible for a low flexural strength compared to the tensile strength.

Example 2

Hybrid Self-Reinforced Polyamide Composites (Inter & Intralayer)

Study outline. Novel self-reinforced carbon fibre hybrid composites were developed based on Nylon 6 (PA) in a intra-layer and interlayer setup. In the intra-layer hybridisation, highly stretched PA6 tapes are co-woven with PA6/T700 carbon fibre prepreg tapes, to produce a cloth, which is then processed using the hot compaction technique. In the inter-layer technique, the T700/PA6 prepreg tapes were simply laminated together with sheets of self-reinforced PA6. In the study, the volume fraction of the carbon fibres, compaction conditions (particularly compaction temperature) and the weave style were varied.

Composite Preparation:

Continuous carbon fibre (type T700) reinforced PA prepreg tapes were obtained from Toray Europe with a carbon fibre volume fraction of ~50%. The tapes were 3.2 mm wide and 0.28 mm thick. Oriented PA6 tapes were produced at Leeds using a purpose built draw frame. Experiments showed that the best properties for the drawn tape were from by a two stage drawing procedure. For the first draw, the ratio was 7:1 at a temperature of 120° C., followed by a subsequent draw of 2:1 at 140° C.

Intra-Layer Configuration:

The two tapes (highly drawn PA6 and T700 carbon/PA6 prepreg) were woven on a hand loom to produce cloth. For the pure PA6, both the warp and weft were from the PA6 drawn tapes. For the hybrid co-woven cloth, the PA6 drawn tapes formed the warp and the T700/PA6 tapes the weft. The cloths produced were around 200 mm wide and 800 mm long. Next, the cloths were made into hybrid samples using the hot compaction process. The optimum compaction temperature was found to be 202±1° C. For these tests, the carbon fibre tapes were arranged in one direction (the subsequent testing direction). By using different amounts of the two cloths, a range of carbon fibre volume fractions were obtained (from 0 to 30%).

Inter-Layer Configuration:

For the interlayer samples, lengths of the PA6/T700 prepeg tapes were laminated on the outside of a pure PA6 hot compacted sheet.

Figure 2:
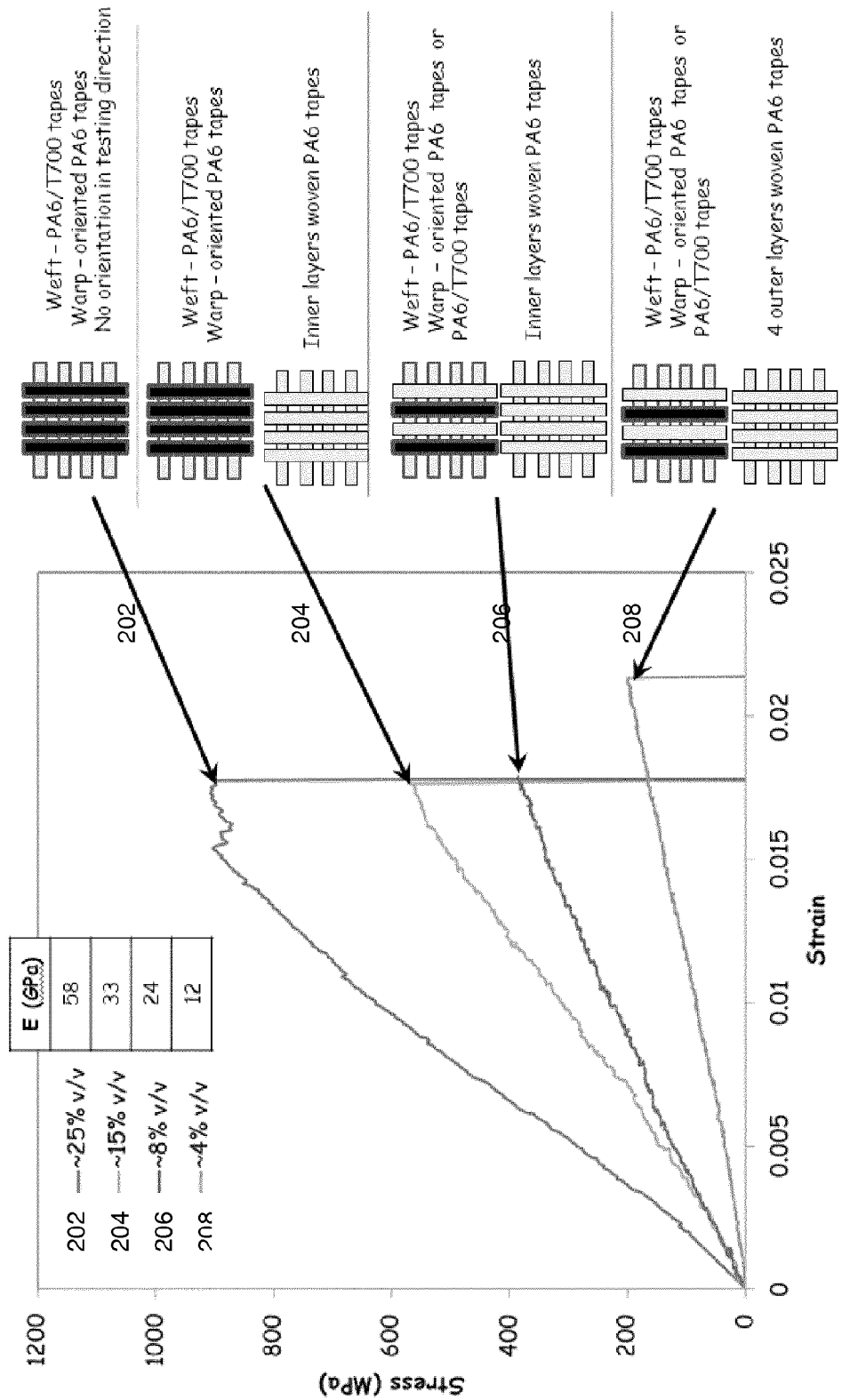
FIG. 2 shows the tensile tests on PA6 based intra-layer hybrids with varying carbon fibre volume fraction, illustrating features and advantages of embodiments of the present invention.

Tensile Tests—Intralayer Configuration:

As described above, in the first series of tensile tests (performed according to ASTM standard D3039) the composites were made with the carbon fibres all laid in the same (testing) direction. They were then interleaved with layers of pure PA6 woven cloth to change the fibre volume fraction. These latter samples can be considered to be a mixture of intra and inter-layer hybridisation. FIG. 2 shows the results of tensile tests and the various lay-ups in curves 202, 204, 206 and 208. All the samples tested, even at the lowest carbon fibre volume fraction of 4%, showed brittle failure (strain to failure of ca. 2%), that is catastrophic failure of the sample once the carbon fibres break. Only at low carbon fibre content, we see an increase in the failure strain. This is very different behaviour to a 100% PA6 SRP composite sheet, which shows a much lower modulus but a strain to failure of 10%.

Figure 3:
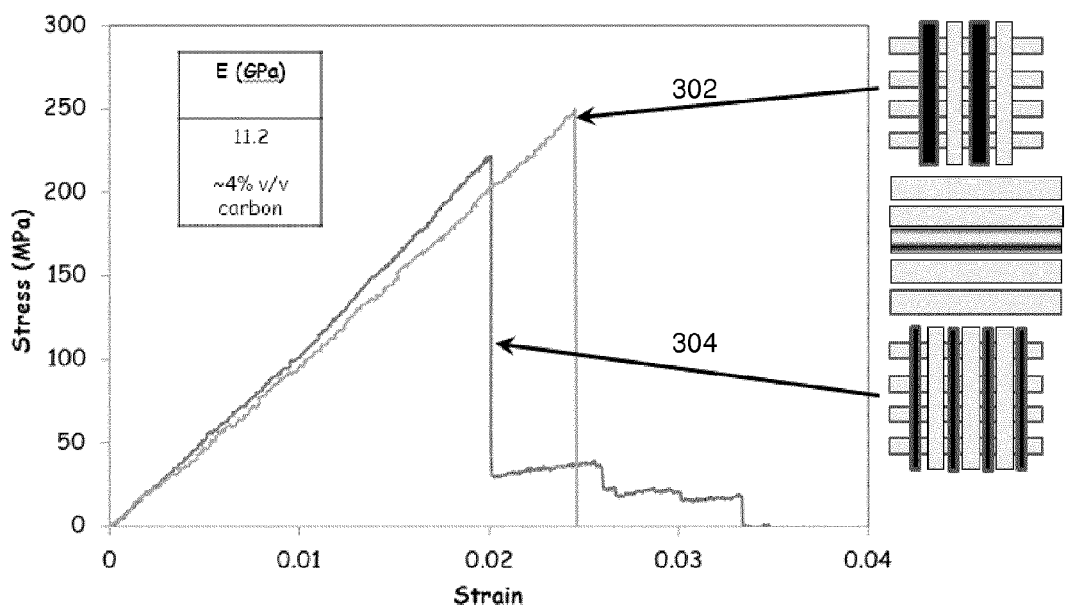
FIG. 3 shows the effect of the width of the reinforcing prepreg tapes on the hybrid carbon fibre SRPA performance, illustrating features and advantages of embodiments of the present invention.

In the next set of experiments, the carbon fibre prepreg tape was cut in half and then co-woven with the oriented PA6 tapes. This had the effect of reducing the amount of carbon fibre at any location by 50%. FIG. 3 shows that for the samples tested in tension with this configuration, some load bearing capability remained after the carbon fibres were broken. This suggests that separating the carbon fibres could mediate the shock effect of the carbon fibres breaking and releasing their stored energy. Interestingly, when the carbon fibre tapes are split in two, a more ductile behavior is observed. After the carbon fibre layer breaks, the SRPA6 layers still continues to carry some load, although it's limited. This clearly shows the importance of intensily mixing both fibre types. In FIG. 3, curve 302 illustrates the reference situation, whereas curve 304 illustrates the situation wherein the carbon fibre prepreg tapes were cut in half.

Tensile Tests—Interlayer Configuration:

For the first interlayer tests, samples were made by placing the prepreg tape on the outside of the SRPA6 woven layers and then using the hot compaction technique as above. These samples all showed brittle failure similar to that described in the previous section for the Intra-layer samples. A second set of tests were carried out, but this time laminating the CF prepreg tapes to the outside of the SRPA6 sheet using a cyanoacrylate adhesive (FIG. 4).

Figure 4:
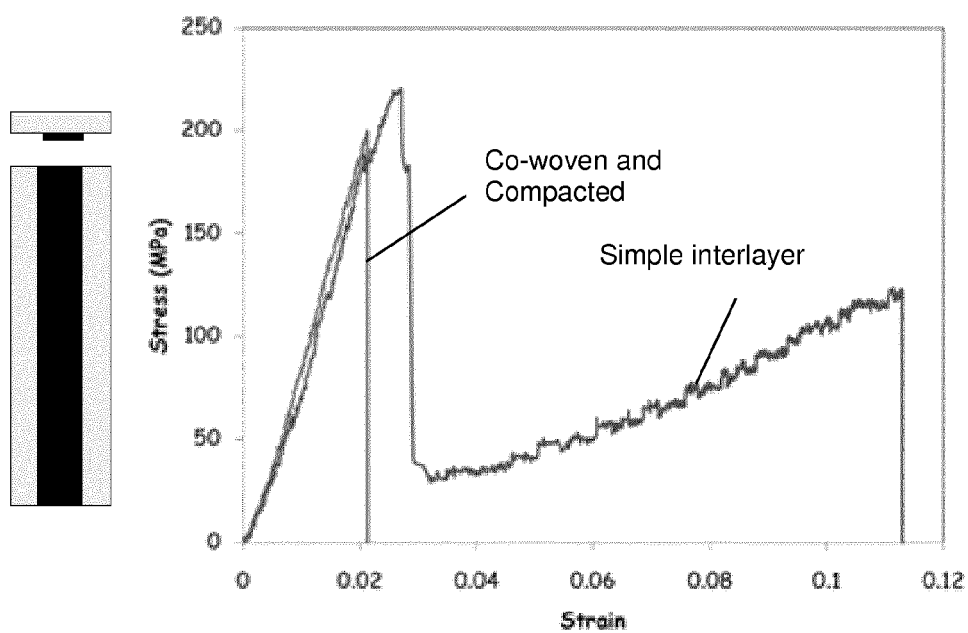
FIG. 4 compares the tensile properties of a co-woven sample and a simple interlayer sample (4 vol % carbon fibre for this comparison), illustrating advantages of different configurations according to embodiments of the present invention.

The results in FIG. 4 show that for this simple laminate, the carbon fibres can break without damaging the SRP PA6 sheet, which then proceeds to carry load until over 10% failure strain. In this configuration, the two components effectively behave in parallel (more or less independently from each other), with the resulting hybrid combining the best aspects of the two component: a stiffness of 11 GPa, a strength of 230 MPa and a failure strain of 11%. This kind of stress-strain curve shows that the material has a high stiffness and strength in regular use and can still absorb a lot of energy when impacted.

Figure 5:
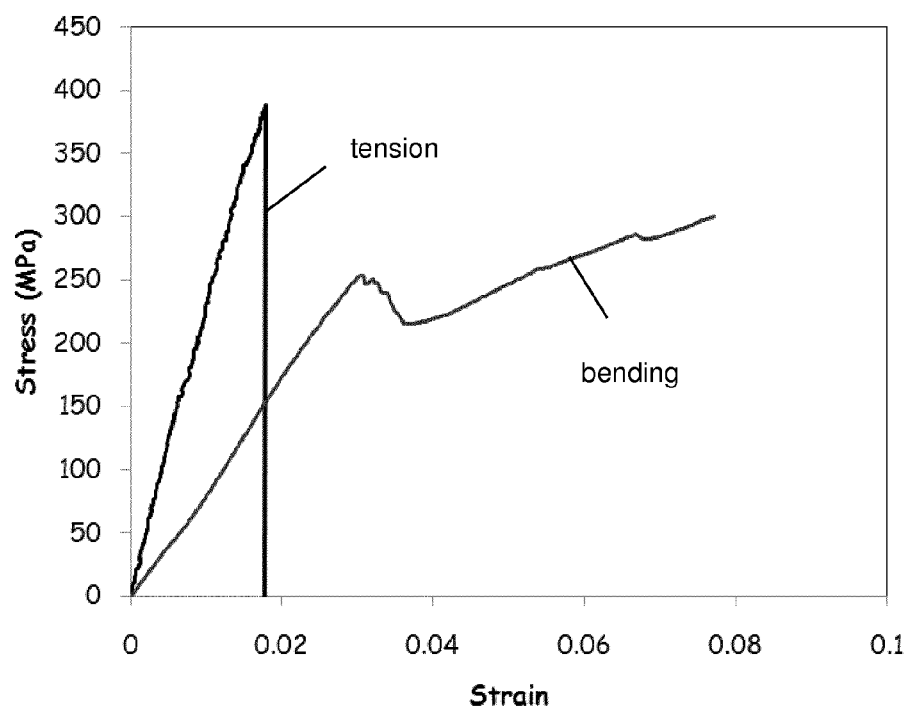
FIG. 5 compares the tensile and bending properties of a hybrid SRPA/carbon fibre sample, illustrating features and advantages of embodiments of the present invention.

Bending Tests—Intra Layer Configuration:

Bending tests were also carried out on the intra-layer (co-woven) samples under ASTM D790. Interestingly, the co-woven nylon hybrids were found to be ductile in flexure, compared to their brittle behaviour in tension. It was seen that the sheets retained their load carrying capacity even after the carbon fibre broke. FIG. 5 shows a typical comparison of a tension test and a flexure test on the same hybrid intra-layer sample. The flexural modulus was measured to be lower in flexure (as the carbon is located towards the centre of the sample), but remained intact once the carbon layer had fractured.

Figure 6A:
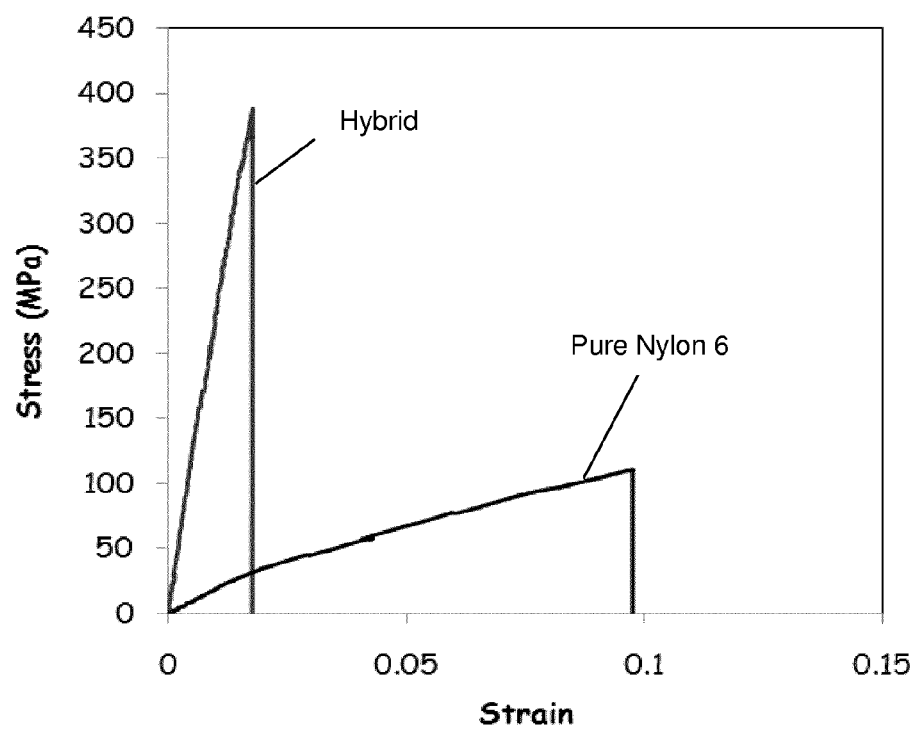
FIG. 6a and FIG. 6b shows the tensile properties (FIG. 6a) and bending properties (FIG. 6b) of a pure PA6 sheet and a hybrid sample, thereby illustrating features and advantages of embodiments of the present invention.
Figure 6B:
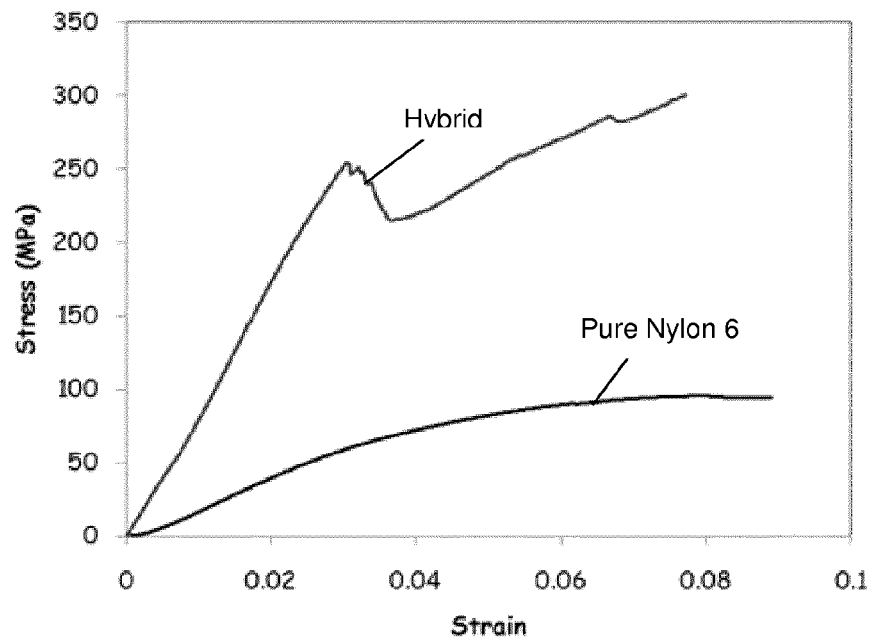

FIG. 6a and FIG. 6b summarises the tensile respectively bending properties of the intra-layer hybrids compared to the pure SRPA6 sheet. In both cases, the hybrid sample has a much improved stiffness and strength. Whereas in tension, the sample breaks once the carbon fibres break, in bending this does not occur, and the sample is not seriously damaged when the carbon fibre fraction breaks.

For the intra-layer (co-woven) hybridisation strategy, samples were found to be brittle in tension, that is once the carbon fibres broke, the samples as a whole broke: the carbon fibre failure presumably dramatically damages the SRPA6, which is unable to deal with this damage. This behaviour can be improved by a smart placement of the carbon fibre layers; limiting the amount of carbon fibre and/or decreasing the adhesion of the carbon fibre, such as e.g. by using PP instead of PA (see Example 4). However, in bending, this was not the case, with the hybrid samples remaining load bearing up to a high failure strain even after the breakage of the carbon fibres. For the interlayer hybridisation, an alternative strategy was adopted, where the prepreg tapes were located on the exterior of the SRPA6 sheets. In tensile testing this combination was found to behave in parallel, so that the composites showed ductile behaviour even after the breakage of the carbon fibres.

Example 3

Hybrid Self-Reinforced Polypropylene Composites (Intralayer)

Figure 9:
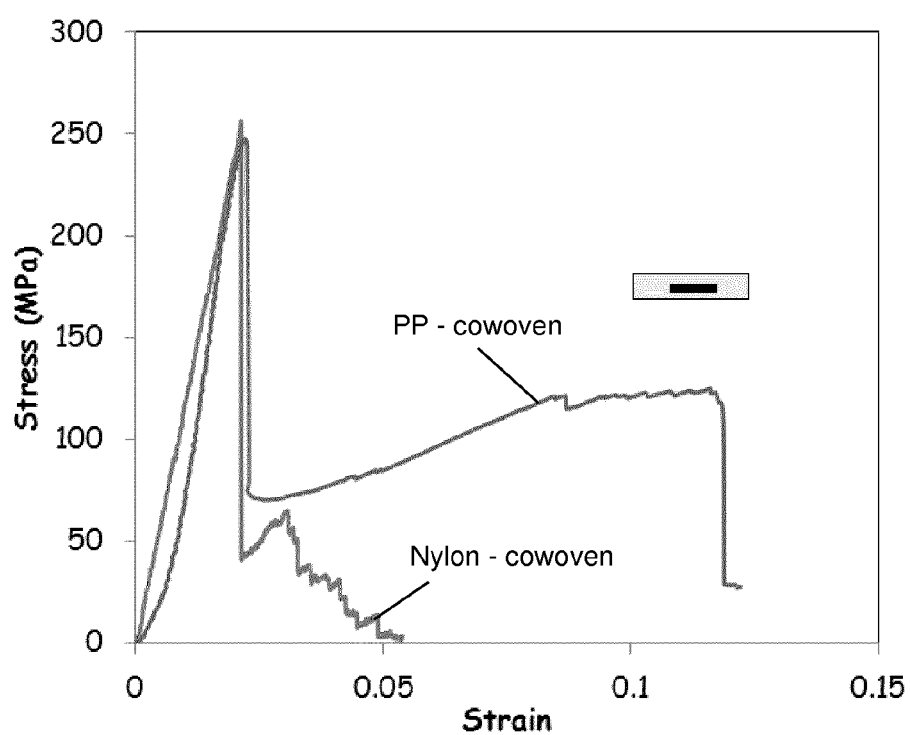
FIG. 9 illustrates a comparison of the tensile behaviour of intralayer SRPA6 and intralayer SRPP hybrids (CF content of ca. 4 vol %), thus illustrating features and advantages of embodiments of the present invention.

Comparison Between Cowoven Hybrid SRPA6 & Hybrid SRPP:

Using a similar setup as in example 2, a cowoven hybrid CF/SRPP composite was made (carbon fraction ca. 4%) & the result is depicted in FIG. 9. Although the mechanical properties at low strains are comparable, the PP hybrid composites show a ductile behaviour, while the nylon sample show a more brittle & less ductile behaviour. It seems the failure of the carbon fibres damages the SRPP to a lesser extent.

Tensile Properties of Cowoven Hybrid SRPPs with Varying CF Content:

Hybrid weaves of PP tapes and CFPP tapes were prepared as follows. First, a UD cloth was created, in which carbon fibre is only in 1 direction, while the PP tapes are in both directions. The carbon fibre volume fraction was diluted by adding additional SRPP weaves on the outside. Next, these configurations were hot compacted.

Figure 10:
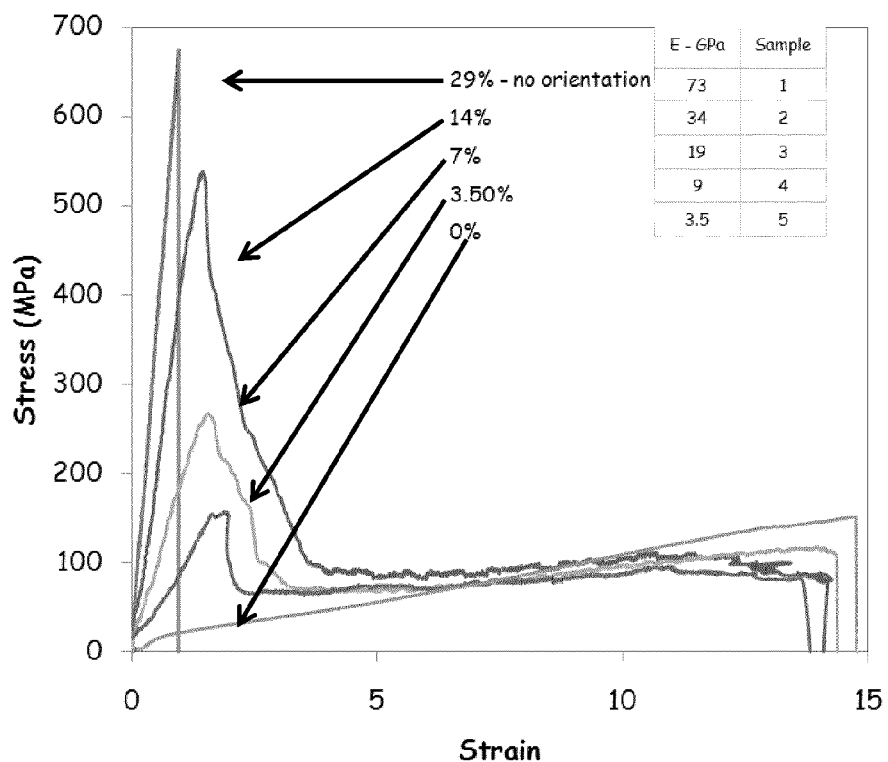
FIG. 10 represents the tensile behaviour of intralayer CFPP/SRPP hybrids, thus illustrating features and advantages of embodiments of the present invention.

FIG. 10 shows the results of tensile tests. The following clear trends appear:

The failure strain of the carbon fibre layers increases with lower fibre volume fractions. Surprisingly, this failure strain enhancement is about 100%.

The SRPP layers are almost unaffected by the fibre volume fraction of carbon fibre. The plateau and the failure strain are almost the same as for the non-hybrid SRPP.

Figure 11:
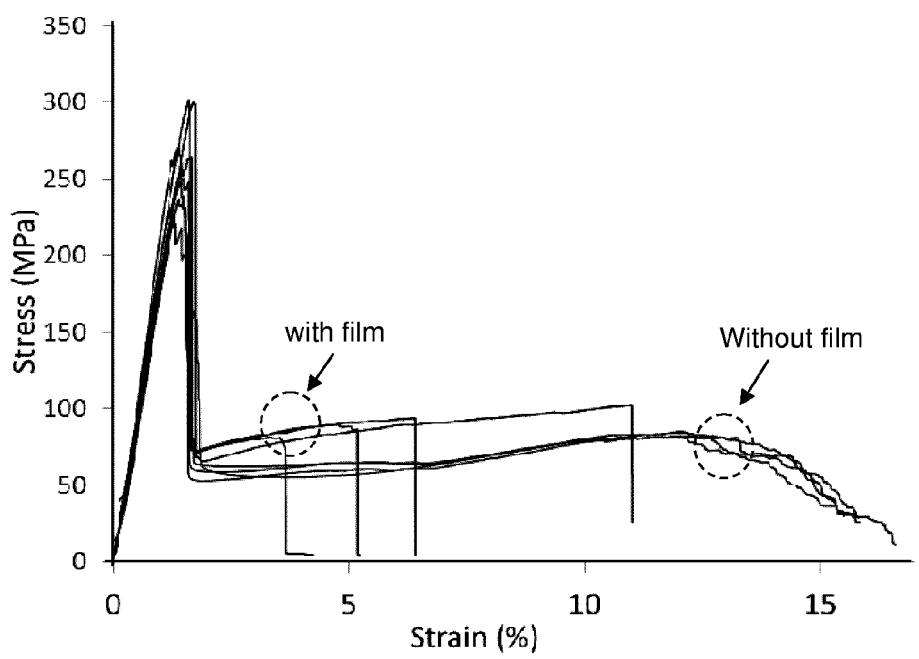
FIG. 11 shows the tensile behaviour of intralayer CFPP/SRPP hybrids with CF in both directions, illustrating features and advantages of embodiments of the present invention.

In a second setup, UD cloths were woven at a carbon fibre volume fraction of about 14%. Eight of these cloths were stacked in 0° and 90°, to obtain a balanced and symmetric laminate. Carbon fibre is hence present in 2 directions. This was done twice: once with and once without an interleaved PP film. The results are shown in FIG. 11.

Without the interleaved PP film, the two constituents of the hybrids behave predominantly independent of each other. At low strain, the behaviour is dominated by the CFPP. When the CFPP breaks, the SRPP starts carrying the main load. The CFPP still contributes a little bit of stress, since the SRPP cannot reach 50 MPa at a strain of 2%. The tensile behaviour changes when an interleaved film is added. The stress at both low and high strains increases. Presumably because of the improved adhesion, the damage stays localized. While the delamination in the hybrids without film can spread over the entire sample, this is not the case for the hybrids with film. The improved adhesion also results in a larger contribution of the carbon fibres, even after 2% strain. This results in a higher stress at higher strains.

Some hybrid CF/SRPP's were also tested in three point bending mode. In contrast to what was found for the hybrid CF/SRPA6 composites (FIG. 6), the flexural strength of the hybrid SRPP composite is low compared to the tensile strength. Without being bound by theory, the low flexural properties may be due to the low internal adhesion of the hybrid SRPP. This can be improved by adding an interleaved PP film. However, the low adhesion seems to be good for the tensile and probably also for its impact properties. These results clearly suggest that controlling the adhesion (such as by changing the material and/or inclusion of an interleaved film) leads to different composite materials with a different range of tensile and flexural properties.

Example 4

Hybrid Self-Reinforced Polyamide Composites (Intrayarn)

CF/PA12 commingled yarns (with CF content of 25 vol %) were obtained from Schappe Techniques (France). Analysis of the microstructure of the yarns showed that the fibres are not continuous. However, the shortest carbon fibre still measure a few centimeters, resulting in an aspect ratio well over 100. Therefore, no significant influence on stiffness or strength is expected.

Hot-compacting the commingled yarn at 190° C. ("UD 190° C.") results in the complete melting of the PA12 fibres. This way, a well-impregnated non-hybrid thermoplastic composite is obtained (with CF fibres in a PA12 matrix).

Figure 12:
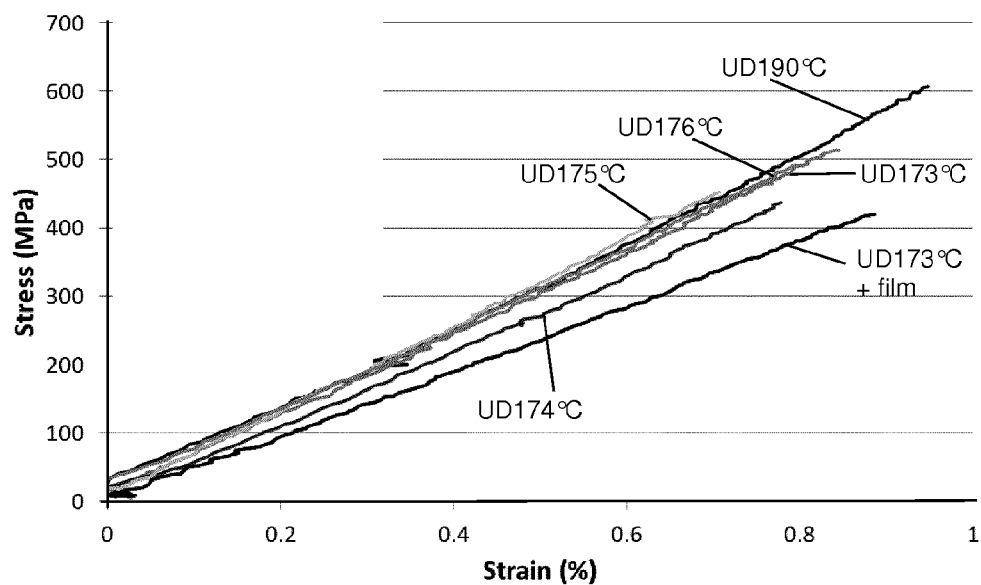
FIG. 12 shows the tensile behaviour of CF/PA12 intrayarn hybrids, illustrating features and advantages of embodiments of the present invention.

Hot compacting the commingled yarn in the range 173-176° C. results in the selective melting of the outside of the PA12 fibres, while the inner core of the PA12 fibres maintains its good mechanical properties. This way, a self-reinforced CF/SRPA12 composite is obtained. FIG. 12 shows the tensile behaviour of the CF/PA12 intrayarn hybrids. The hot-compaction temperature does not seem to affect the tensile behaviour to a large extent, although the strength and failure strain seem to be slightly lower for samples compacted at 173-176° C.

The flexural behaviour of these intrayarn hybrids are however significantly different from the fully molten "UD 190° C." sample. The "UD 190° C." sample behaves completely brittle (with failure of the composite at a strain of ca. 2%). The sample compacted at 173° C. on the other hand still has a ductile part of the first load drop. By choosing the right compaction conditions, carbon fibre composite can be obtained to behave ductile in bending.

In a further set of experiments, the intrayarn filaments were braided into a cloth. Samples were hot compacted using the temperature range suggested by the above first set of tests.

Figure 13:
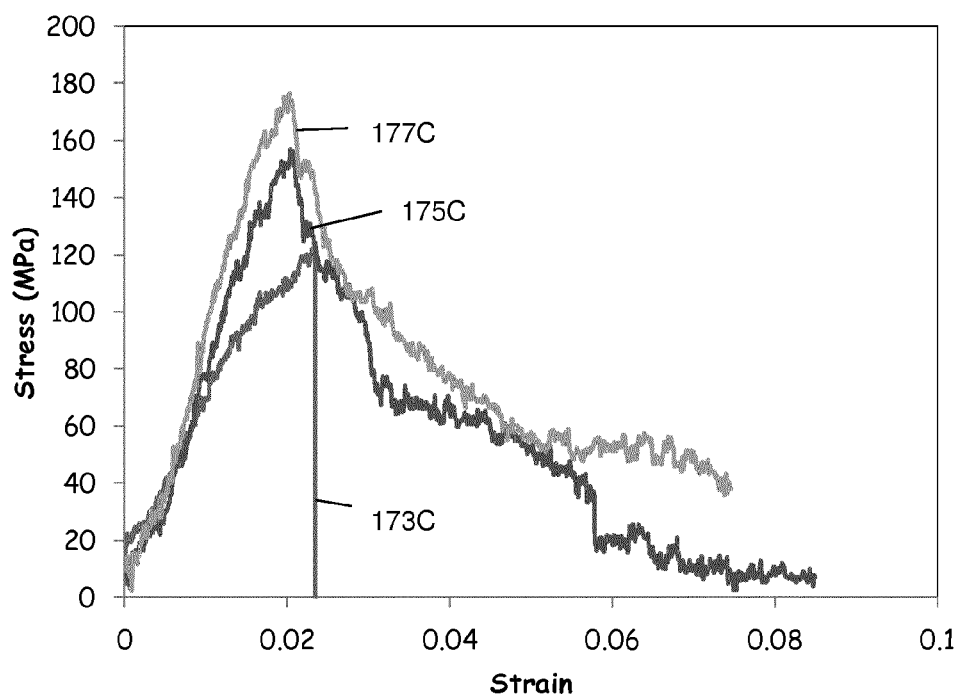
FIG. 13 shows the tensile properties of braided CF/PA12 intrayarn cloth, thus illustrating features and advantages of embodiments of the present invention.

The results are presented in FIG. 13 and showed that while at a low compaction temperature the sample showed brittle failure, above a critical temperature (~175° C.) the sample remained load bearing once the carbon fibres had broken. The samples made at the higher temperature also showed a significantly increased area under the tensile stress-strain curve, indicating improved toughness over the other hybrid nylon based samples.

Figure 14:
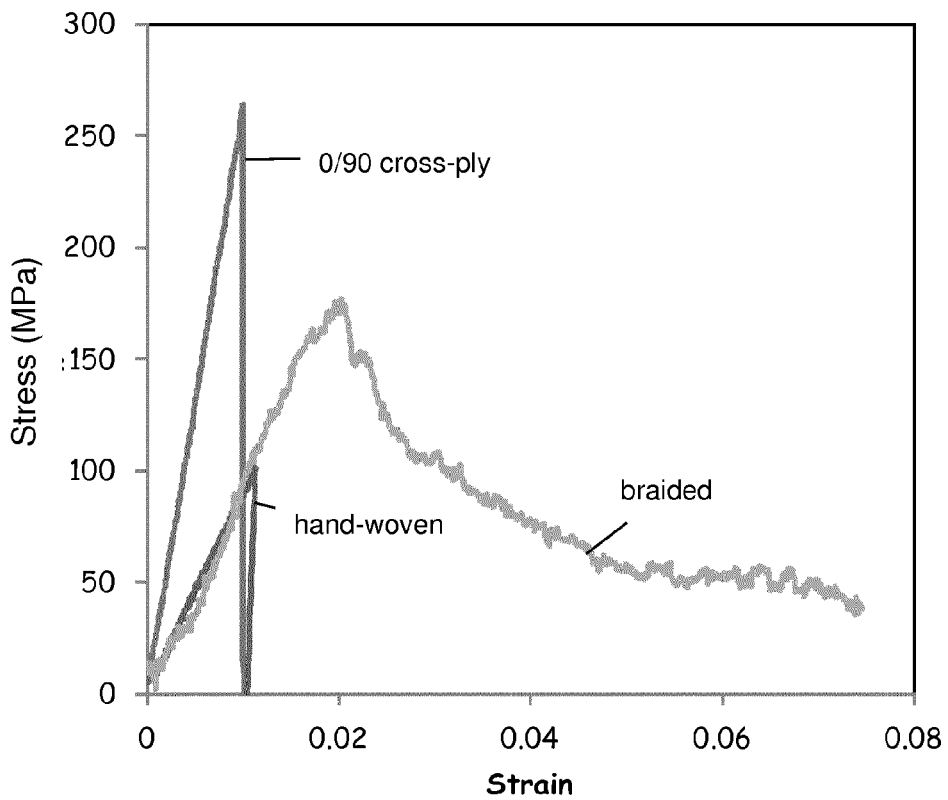
FIG. 14 compares the tensile properties for different weave styles for the intrayarn samples, thus illustrating features and advantages of embodiments of the present invention.

FIG. 14 shows the tensile properties of intrayarn samples made with three different weave styles: a 0/90 laminate (with completely straight fibres), a hand woven plain weave sample (with significant crimp) and braided cloth (4×4 twill). The results show that the weave style has a significant effect on the tensile properties. The 0/90 cross ply showed the highest stiffness and strength but a low failure strain. The hand woven cloth showed both a low modulus and strength and still a low failure strain. The braided cloth showed a lower modulus and strength but a much higher failure strain, both at the point where the carbon fibres break (~2%) and then at final fracture (~8%).

Example 5

Hybrid Self-Reinforced CFPP/SRPP Hybrids

The influence of the dispersion was studied in CFPP/SRPP hybrids. In this example the influence of the degree of dispersion was studied by attaching continuous CFPP prepregs to SRPP weaves using heat resistant tape and by altering their distribution. Using this setup, the degree of dispersion could be easily varied by splitting the CFPP bands and by changing the spacing between the tapes at the same time so that the same global fibre volume fraction was maintained, thus studying the effect of dispersion and not of amount of fibres. In the produced samples, this was 18% in both cases.

Figure 15:
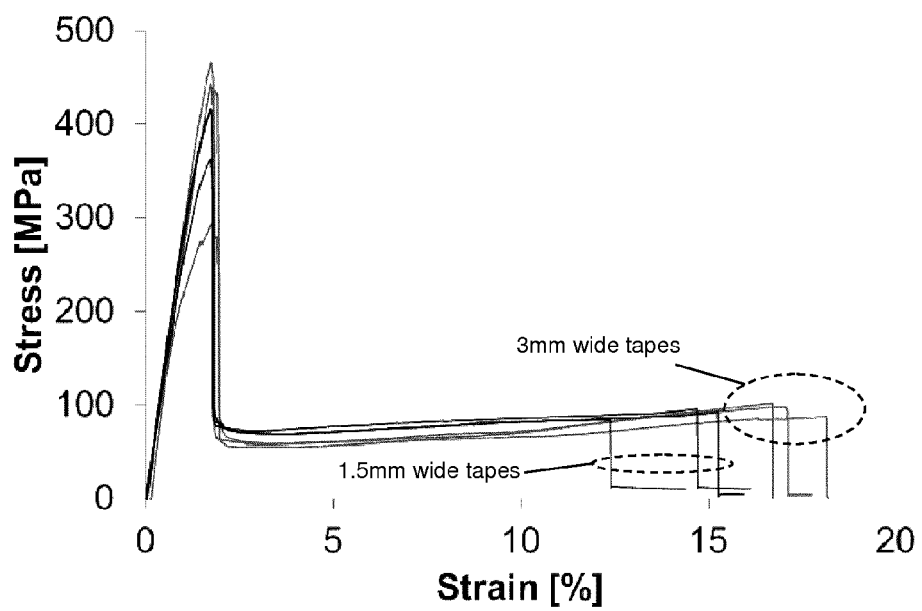
FIG. 15 illustrates the influence on the tensile diagram of the degree of dispersion of brittle fibres in a particular setup, illustrating an advantage of embodiments of the present invention.

The tensile diagrams are shown in FIG. 15. No significant difference was found for the first peak, which is related to the CFPP peak. Some differences can be observed in the second part of the tensile diagram. In the samples with 3 mm wide bands, the stress falls back to 58±2 MPa, while this is increased to 70±1 MPa if the bands are only 1.5 mm wide. The stress level in the second part is hence higher if the prepregs bands are narrower. This means that a higher degree of dispersion is able to spread out the CFPP failure more, which results in a lower damage to the SRPP. Moreover, the CFPP is able to contribute to some stress transfer in the second part of the diagram. If the dispersion is increased, this contribution is increased. This demonstrates the relevance of the degree of dispersion for maintaining the SRPP ductility in SRPP/CFPP hybrid composites. It is expected that at even better dispersions, this effect will be stronger.

Figure 16:
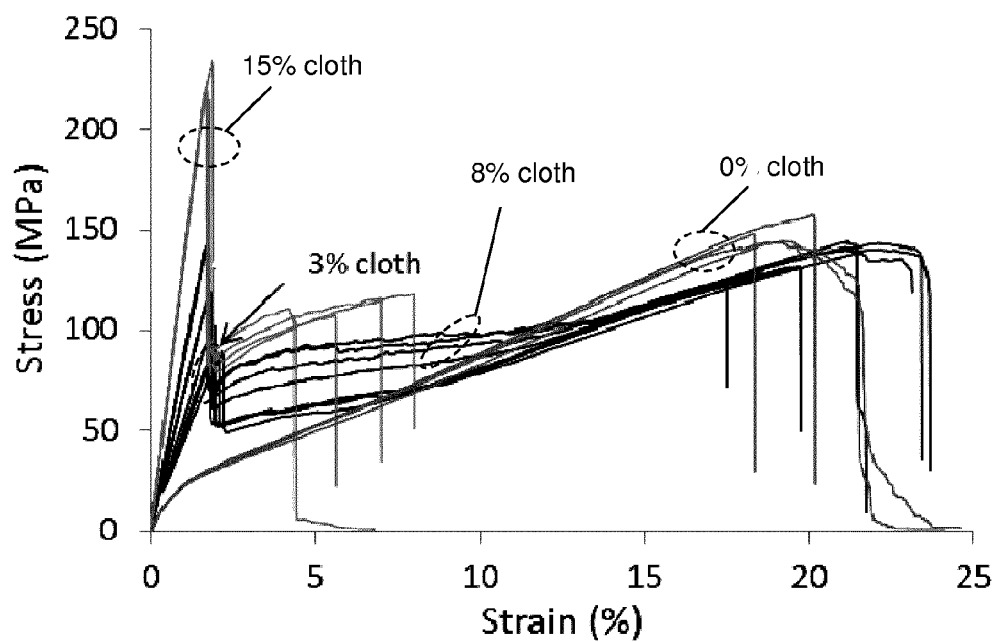
FIG. 16 illustrates the influence of carbon fibre volume fraction on the tensile diagram of intralayer SRPP/CFPP hybrids, illustrating features and advantages of embodiments of the present invention.
Figure 17:
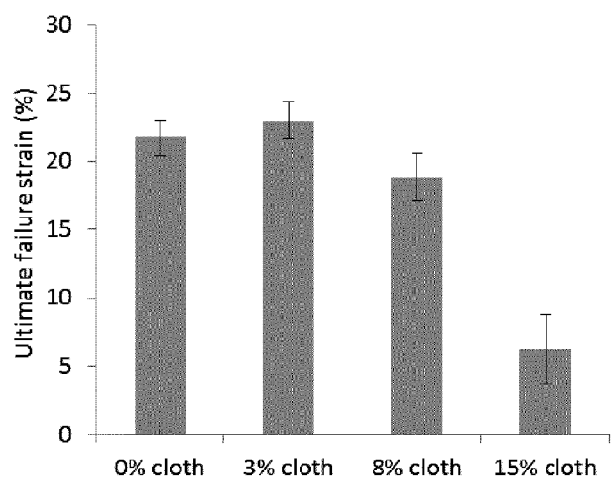
FIG. 17 illustrates the failure strain of the hybrid cloths, compared to the non-hybrid reference cloth, illustrating features and advantages of embodiments of the present invention.

The influence of the carbon fibre volume fraction in an intralayer SRPP/CFPP hybrid was also studied. Three different intralayer SRPP/CFPP weaves were produced at different carbon fibre volume fractions: 3%, 8% and 15%. The tensile diagrams for these weaves were compared with the SRPP cloth with 0% carbon fibre, as shown in FIG. 16. When using a high carbon fibre volume fraction, the CFPP adds more matrix, which caused a stronger interlayer bonding. This drastically reduces the failure strain, in the case of the 15% cloth. This is further shown in FIG. 17.

Figure 18:
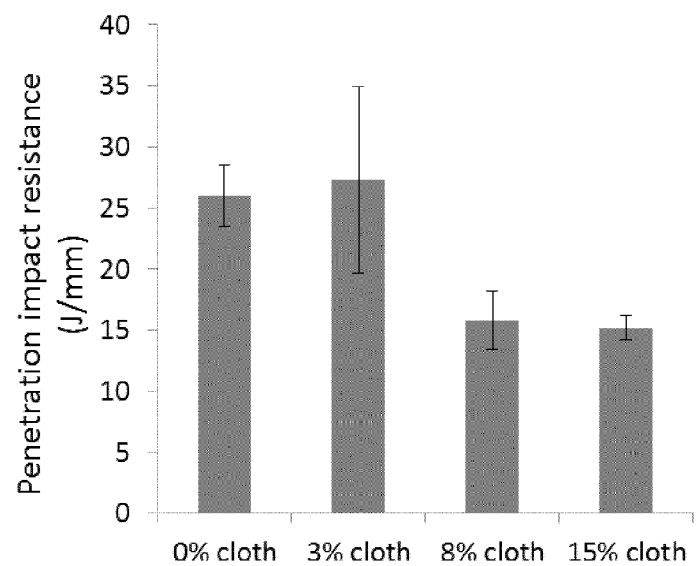
FIG. 18 illustrates the penetration impact resistance of the hybrid cloths, compared to non-hybrid reference cloths, illustrating features and advantages of embodiments of the present invention.

The penetration impact resistance of the same materials is shown in FIG. 18 illustrating that the toughness of the SRPP can be maintained, but only if the carbon fibre volume fraction is sufficiently low.

Example 6

Carbon Fibre Composites Hybridised with Self-Reinforced Polypropylene

Example 6 illustrates a further example wherein a good balance between toughness on the one hand and stiffness and strength on the other hand is obtained. The example illustrates hybridisation of carbon fibre-reinforced composites with ductile fibres. The following example illustrates particular features, embodiments of the present invention not being limited thereto.

The applicability of SRPP was previously hampered by the limited stiffness and strength, but this can be improved by hybridisation, which can be done in the three different configuration as described above. Results will be presented for intralayer hybrids of continuous carbon fibre polypropylene (CFPP) with SRPP. The highly oriented PP tapes in SRPP add a tough material to the brittle CFPP. Polypropylene (PP) tapes having a draw ratio between 1:10 and 1:15, a stiffness of 8-10 GPa, and a strength of 500-600 MPa. The unidirectional carbon fibre polypropylene prepregs were 300 µm thick and 55 mm wide, but were slit manually to 2.5 mm width. The fibre volume fraction is 47 vol % and the type of fibres is T700S. A 20 µm thick PP film was also provided. This film has a melting point of 163° C. and consists of the same PP grade as the tapes.

The PP tapes and CFPP prepreg tapes were woven into hybrid fabrics. Folding of the tapes was avoided by using a hand loom. The warp direction was composed of only PP tapes, while 1 out of 4 tapes in the weft direction was a CFPP prepreg. This fraction of CFPP prepregs to PP tapes was chosen to give a carbon fibre fraction in the final composite sheet of around 20%.

Two weave patterns were woven to assess the influence of the weave pattern and crimp. To obtain a large difference between both patterns, a plain weave was compared to sateen 8/3 weave. The plain weave pattern has the highest possible crimp of all standard patterns. The sateen 8/3 pattern has a low amount of cross-overs and hence a low crimp. After hot compaction, each layer will have an average thickness of around 150 µm. A plain weave without carbon fibre prepregs was also woven. This will be used as reference material to compare the hybrid composites with.

A total of 8 layers of the fabric were stacked on top of each other in a $0_8$ or $(0-90-0-90)_s$ layup. The weft direction is labelled as the 0° direction, as this is the stiffest and strongest direction. The layups are abbreviated to 0° and 0°/90° respectively. Note that the layup for the reference SRPP fabric is irrelevant, since the 0° and 90° are identical.

The layup is put in between two 1 mm thick copper cover plates and inserted into a preheated press at 188° C. It is hot compacted for 5 minutes at 45 bar pressure, after which it is cooled down to 40° C. in 4 minutes.

The reference CFPP material was pressed in a copper channel mold to avoid flow at the edges. The processing conditions are the same, apart from a lower pressure. Pressure was lowered to 5 bar to prevent the material from flowing out of the mold, which would misalign the fibres. The higher pressure for the SRPP reference and hybrids is needed to overcome the entropic shrinkage of the PP tapes during hot compaction.

In one layup, seven interleaved PP films were inserted in between the eight hybrid fabrics. Apart from decreasing the carbon fibre volume fraction from 22% to 19%, the films also create more matrix material. This increases the adhesion between the layers and widens the temperature window for hot compaction.

Tensile Tests

Quasi-static tensile tests were performed according to ASTM D3039. Tensile samples of 250×25 mm were waterjet cut to minimise the damage to the sample edges. The strain was measured by averaging the surface strain using digital image correlation. After the carbon fibre failure, the surface is damaged and the surface strain cannot be measured anymore. To solve this problem, the crosshead displacement is used to calculate the strain after the carbon fibre failure. This correction is accurate due to two reasons. Firstly, the error in this correction is proportional to the load, which shows only a small variation. Secondly, the correction was verified on samples without damaged surfaces.

Figure 19:
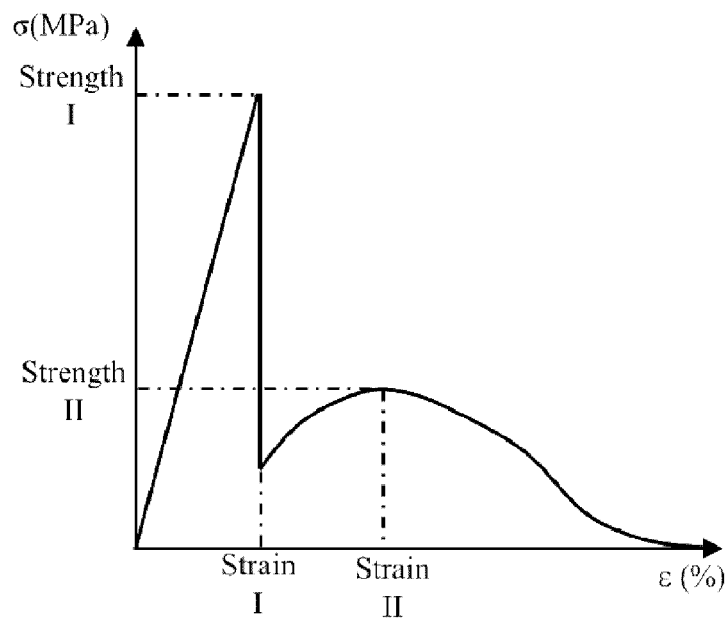
FIG. 19 illustrates a schematic tensile diagram with illustration of the relevant tensile properties, illustrating features of embodiments of the present invention.

The tensile modulus is calculated as the slope between 0.1% and 0.3% strain. The strength is calculated at two different strains: the strain at which CFPP fails and the strain at which SRPP fails. Both these strengths and the corresponding strains are labelled as I and II. These strains and strengths are illustrated in FIG. 19.

Matrix burn off tests were performed according to ASTM D2584. The samples are heated in porcelain crucible until the PP matrix ignites. The samples are then inserted into a muffle furnace for eight hours at 450° C. The fibre weight fraction is calculated based on the sample weight before and after burn off. This is converted into a fibre volume fraction by assuming a density of 1800 kg/m³ and 920 kg/m³ for CF and PP, respectively.

Figure 20:
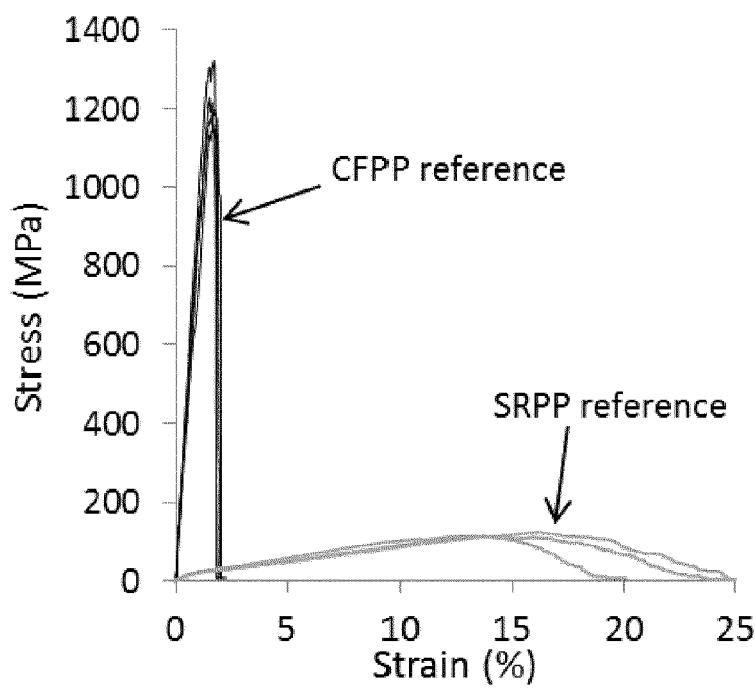
FIG. 20 illustrates tensile diagrams of the reference materials, as can be used for illustrating features of embodiments of the present invention.

The described hybrid composites consist of two components: CFPP and SRPP. FIG. 20 illustrates the tensile diagrams of both reference materials. CFPP demonstrated a high stiffness and strength, but a low failure strain. This is in strong contrast with the low stiffness and strength of SRPP. These lower tensile properties are compensated by the increased failure strain.

Figure 21:
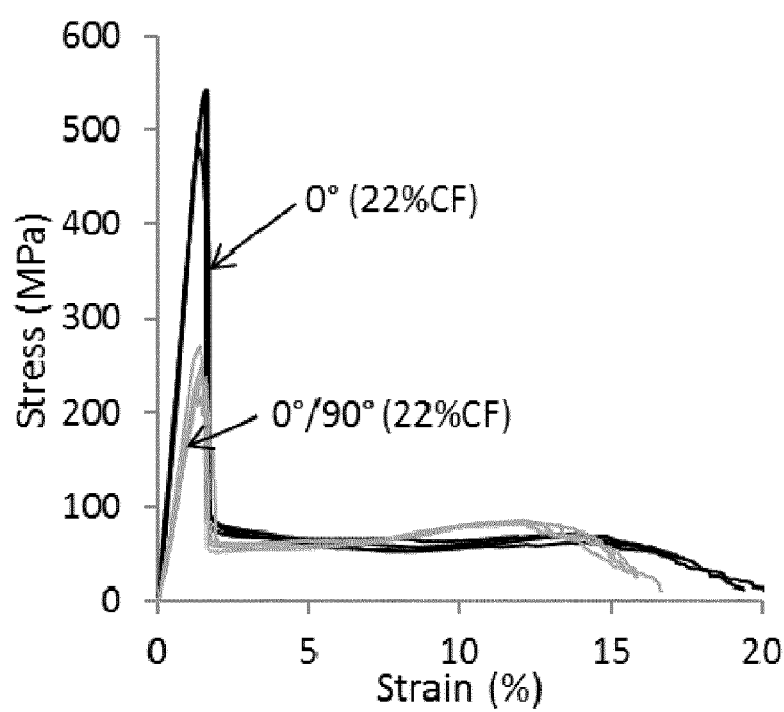
FIG. 21 illustrates tensile diagrams of the 0° and 0°/90° plain weave intralayer hybrids illustrating features of embodiments of the present invention.

Since the weaves only have carbon fibre in the 0° direction, the layup is vital for the mechanical properties of the hot compacted sheets. Therefore, 0° and 0°/90° layups were hot compacted and tested. Their tensile diagrams are presented in FIG. 21, while the second and third columns of table 2 summarize the tensile properties.

By way of illustration, the tensile properties of the reference materials are shown in the table below.

|  | CFPP | SRPP |
|---|---|---|
| Stiffness (GPa) | 91 ± 5 | 3.0 ± 0.2 |
| Strain (%) | 1.6 ± 0.1 | 14.3 ± 1.7 |
| Strength (MPa) | 1227 ± 70 | 117 ± 5 |

Both layups demonstrated a distinct CFPP peak at about 1.5% strain, followed by a SRPP tail. The properties in the second part of the stress-strain diagram are hardly affected by the layup. The SRPP seems to remain unaffected by the energy released upon CFPP failure. Both components can be considered as acting independently. This is possible because of a combination of the high SRPP ductility and the well-known low adhesion between CF and PP.

A crucial difference between both layups is the amount of carbon fibre in the tensile direction. The 0°/90° layup only has half of the carbon fibres in the tensile direction compared to the 0° layup. This results in a stiffness difference of a factor two. Based on the carbon fibre volume fraction of 22% and a CF stiffness of 230 GPa, a stiffness of at least 50.6 GPa would be expected for the 0° layup. The measured 33.5 GPa significantly differs from the expected value, however. This difference has two reasons. Firstly, the modulus of CF is typically measured between 0.5 and 0.7% strain, while the composite modulus is measured between 0.1 and 0.3% strain. The CF modulus increases by about 20% between 0% and 0.7%, which means the expected modulus may be reduced to 40.5 GPa. Secondly, the PP tapes have a high tendency to shrink during processing. This can induce misalignment of the carbon fibres, further reducing the composite tensile modulus. Finally it is interesting to note that the SRPP portion of the tensile stress-strain curve is independent of the lay-up, supporting the explanation that the two components are acting independently.

The measured data can also be compared to the predicted behaviour for the 0° layup. The tensile diagram of this layup is easier to predict, as it has no carbon fibres in the transverse direction. The prediction is a rule-of-mixtures based on the experimental reference material data (see FIG. 20), weighed by their relative volume. This assumes both components behave in parallel and do not interact with each other. CFPP's volume can be estimated by dividing the carbon fibre content of the hybrid composite (22%) by the fibre volume fraction of the CFPP prepregs (47%). This results in a relative ratio of 47% CFPP and 53% SRPP. These ratios are used as weighing factors for the stress-strain diagrams of the reference materials.

Figure 22:
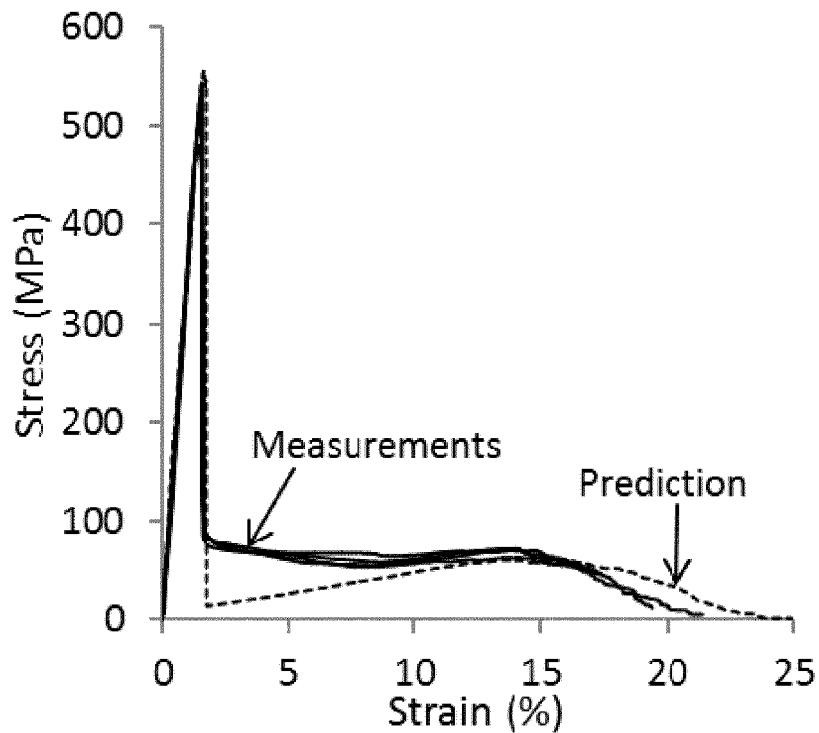
FIG. 22 illustrates a comparison between prediction and measurements of 0° plain weave intralayer hybrids, thus illustrating features and advantages of embodiments of the present invention.

FIG. 22 compares the predicted results with the measurements. The CFPP peak is accurately predicted, both for stiffness and strength. However, a large difference is observed after the CFPP failure. The prediction assumes that CFPP stops carrying load, which means the stress falls back to the level of SRPP at that strain. This results in a vertical stress drop to about 15 MPa. The measured stress is, however, higher, which means the carbon fibres are still carrying a part of the load after they are broken. This results in positive deviation from the rule-of-mixtures, which is often referred to as a positive hybrid effect. This positive effect decreases with increasing strain and disappears at about 12% strain.

A second discrepancy between prediction and measurement is observed around 20% strain. The prediction yields a higher stress level, which means that some damage to SRPP has occurred. In conclusion, the layup affects the mechanical properties of the hybrid mainly through the orientation of CFPP. The SRPP part of the tensile diagram remains largely unaffected by the layup.

Figure 23:
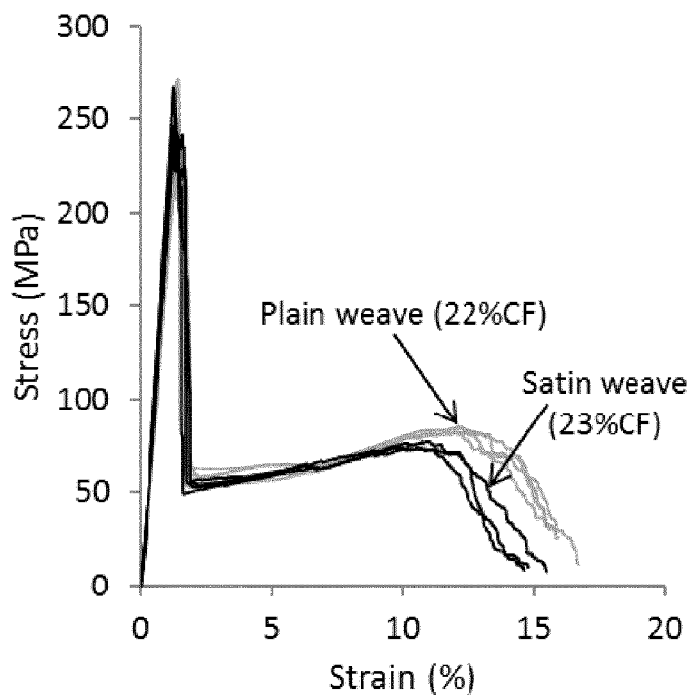
FIG. 23 shows tensile diagrams of 0°/90° intralayer hybrids in plain and satin weave, illustrating features of embodiments of the present invention.

A plain weave is compared to a satin weave to assess the influence of the amount of crimp. The plain weave has more cross-overs, resulting in higher out-of-plane orientation of both the carbon fibres and the PP tapes. FIG. 23 depicts the tensile diagrams of both weave patterns for 0°/90° layups, similar to FIG. 11.

No significant differences were found in the stiffness and strength, which means that the crimp is not affecting the behaviour of the carbon fibres. This can be understood from the dimensions of the CF prepregs and PP tapes. The width over thickness ratio is 8 and 50 respectively, resulting in a low crimp for both weave patterns.

Small differences can be observed in the second part of the tensile diagram. The satin weave has a lower strain II and strength II. This part of the tensile diagram is determined by the damage in SRPP. The cross-overs in the weave pattern act as crack stoppers and tend to limit the extent of the CFPP damage. Since the plain weave has more cross-overs, the CFPP failure damages SRPP over a smaller region. This results in higher strain II and strength II for the plain weave. Moreover, the higher number of cross-overs in the plain weave also results in a wavier surface than in the satin weave. The plain weave's wavier surface results in a higher resistance against delamination and a delayed onset of damage.

The table below illustrates the tensile properties of the hybrid composites.

| Layup | 0° | 0°/90° | 0°/90° | 0°/90° |
|---|---|---|---|---|
| Pattern | Plain | Plain | Satin | Plain |
| Film | No | No | No | Yes |
| Stiffness (GPa) | 33.5 ± 3.0 | 16.1 ±1.7 | 16.1 ± 2.0 | 17.8 ± 0.6 |
| Strain I (%) | 1.5 ± 0.1 | 1.4 ± 0.1 | 1.5 ±0.2 | 1.6 ± 0.1 |
| Strength I (MPa) | 522 ± 28 | 245 ± 20 | 252 ± 11 | 280 ± 24 |
| Strain II (%) | 13.9 ± 0.2 | 12.1 ± 0.2 | 10.7 ± 0.6 | 6.3 ± 3.3 |
| Strength II (MPa) | 69.2 ± 4.4 | 84 ± 2 | 75 ± 2 | 92 ± 9 |

In conclusion, a plain weave pattern results in more ductile behaviour, while the stiffness and strength remain unaffected.

Figure 24:
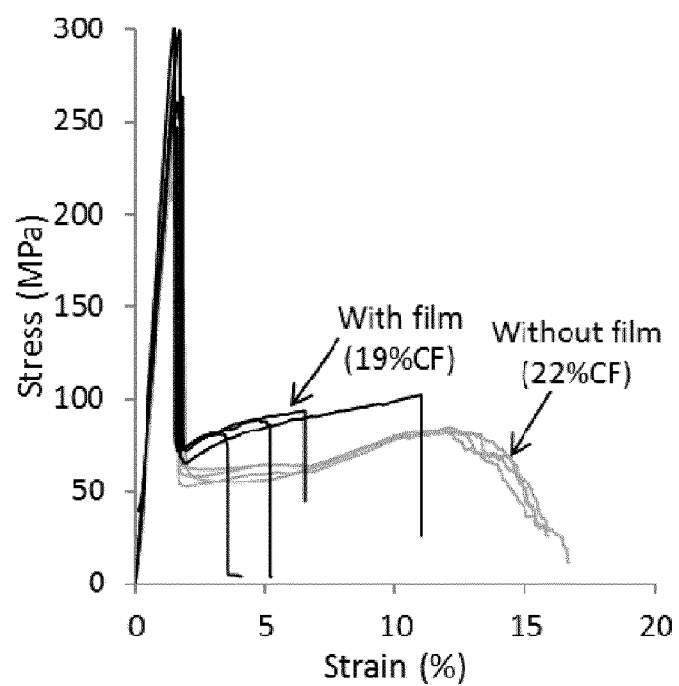
FIG. 24 shows tensile diagrams of 0°/90° plain weave intralayer hybrids with and without film.

Interleaved films were inserted between the hybrid fabrics to increase the amount of matrix created during the hot compaction. This increases the interlayer bonding and hence the resistance against delamination. The tensile diagrams are shown in FIG. 24.

The interleaved films slightly improve the strain I and strength I and result in a sharper CFPP peak. The additional matrix improves the compaction quality and improves the bonding. The latter can delay the onset of failure and increases the sharpness of the peak.

The largest difference is observed in the SRPP part of the tensile diagram. The interleaved film increases the strength II, but dramatically decreases the strain II. This can be understood from the difference in adhesion, which determines the extent of the damaged region. In the composite without the films, the adhesion is low, and the damage spreads out over the entire length of the sample. This prevents the strain from localising in a small region and allows SRPP to be strained independently from CFPP. In composites with interleaved films, however, the improved adhesion limits the extent of damaged area, which localises the applied strain over a smaller length. Locally, the ultimate failure strain is reached before the global ultimate failure strain is reached. At the same time, the improved adhesion allows some of the carbon fibres to contribute to the stress even after the first peak. This results in the increased strength II.

In conclusion, the strength of CFPP and the SRPP peak is increased by interleaved films. The failure strain of SRPP is, however, dramatically decreased.

The invention claimed is:

1. A fibrous self-reinforced composite (SRC) material comprising:
   a matrix phase comprising a thermoplastic polymer; and
   a reinforcement phase including:
   a first oriented polymeric ductile fibre having the same type of thermoplastic polymer as the matrix phase, wherein said ductile fibres have a failure strain of at least 8%, and
   a second high stiffness, brittle fibre, wherein said brittle fibres make up less than 30 vol % of the composite material and have a failure strain of less than 4%;
   wherein said brittle fibres are highly dispersed within said composite material by
   the ductile fibres and the brittle fibres being organised in an intralayer configuration, and/or
   the ductile fibres and the brittle fibres being organised in an interlayer configuration wherein alternatingly a layer of ductile fibres and a layer of brittle fibres is introduced and wherein the thickness of the layer of brittle fibres is smaller than 125 µm times the square root of the ratio (230 GPa/stiffness of the brittle fibre), and/or
   the ductile fibres and the brittle fibres being organised in an intrayarn configuration; and
   wherein the matrix phase is formed around each of the brittle fibres and the ductile fibres such that the brittle fibres and the ductile fibres are completely coated by the matrix material; and
   wherein said composite material has a stiffness of at least 10 GPa, a tensile strength of at least 250 MPa, and an impact (Izod) strength of at least 2500 J/m.

2. A fibrous self-reinforced composite (SRC) material according to claim 1, wherein the ductile fibres and the brittle fibres are organised in an intralayer configuration.

3. A fibrous self-reinforced composite (SRC) material according to claim 2, wherein the intralayer configuration comprises within at least one layer, at least a plurality of brittle fibres in substantially parallel bands, the substantially parallel bands being spaced from each other.

4. A fibrous self-reinforced composite (SRC) material according to claim 3, wherein the spacing between parallel bands in the at least one layer is larger than the average width of the parallel bands.

5. A fibrous self-reinforced composite (SRC) material according to claim 3, wherein the spacing between parallel bands in the at least one layer is at least 5 mm.

6. A fibrous self-reinforced composite (SRC) material according to claim 3, wherein the brittle fibres are present in a first set of parallel bands according to a first orientation, and wherein the ductile fibres are present in a second set of parallel bands according to a second orientation, the second orientation perpendicular to the first orientation.

7. A fibrous self-reinforced composite (SRC) material according to claim 3, wherein within the at least one layer the brittle fibres are configured in woven bands.

8. A fibrous self-reinforced composite (SRC) material according to claim 3, wherein in the at least one layer the brittle fibres are configured in a third set of parallel bands and the ductile fibres are present in a fourth set of parallel bands, the third set of parallel bands and the fourth set of parallel bands having the same orientation.

9. A fibrous self-reinforced composite (SRC) material according to claim 1, wherein the ductile fibres and the brittle fibres are organised in an interlayer configuration;
   the layer of ductile fibres and the layer of brittle fibres is alternatingly introduced; and
   the thickness of the layer of brittle fibres is smaller than 125 µm times the square root of the ratio (230 GPa/stiffness of the brittle fibre).

10. A fibrous self-reinforced composite (SRC) material according to claim 9, wherein the thickness of the layer of brittle fibres is less than 125 µm.

11. A fibrous self-reinforced composite (SRC) material according to claim 1, wherein the ductile fibres and the brittle fibres are organised in an intrayarn configuration.

12. A fibrous self-reinforced composite (SRC) material according to claim 1, wherein the brittle fibres are highly dispersed such that the composite material has at least twice the stiffness, substantially a same or higher strength and at least 0.8 times the failure strain of a self-reinforced composite reference material having no brittle fibres but further having the same composition as the fibrous self-reinforced composite material.

13. A fibrous self-reinforced composite (SRC) material according to claim 1, wherein the matrix phase is produced by hot compaction.

14. A fibrous self-reinforced composite (SRC) material according to claim 13, wherein the matrix phase is produced by selectively melting a fraction of the surface of each oriented polymer element.

15. A fibrous self-reinforced composite (SRC) material according to claim 1, wherein said ductile fibre is a thermoplastic polyolefin, such as PP or PE, or a thermoplastic polyester, or a thermoplastic polyamide.

16. A fibrous self-reinforced composite (SRC) material according to claim 1, wherein said brittle fibre is any of a carbon, glass or natural fibre including a flax fibre.

17. A fibrous self-reinforced composite (SRC) material according to claim 1, wherein said brittle fibres are uniformly distributed within said composite material.

18. A product comprising a fibrous self-reinforced composite (SRC) material according claim 1.

19. A fibrous self-reinforced composite material manufactured using a method for manufacturing a fibrous self-reinforced composite material, the method comprising:

providing a matrix phase comprising a thermoplastic polymer; and a reinforcement phase including:

a first oriented polymeric ductile fibre having the same type of thermoplastic polymer as the matrix phase, wherein said ductile fibres have a failure strain of at least 8%, and a second high stiffness, brittle fibre, wherein said brittle fibres have a failure strain of less than 4%;

wherein said brittle fibres make up less than 30 vol % of the composite material, and the matrix phase is formed around each of the ductile fibres and the brittle fibres;

said providing a matrix phase comprising organising the ductile fibres and the brittle fibres in an intralayer configuration, or organising the ductile fibres and the brittle fibres in an intrayarn configuration;

wherein the matrix phase is formed around each of the brittle fibres and the ductile fibres such that the brittle fibres and the ductile fibres are completely coated by the matrix material; and wherein said composite material has a stiffness of at least 10 GPa, a tensile strength of at least 250 MPa, and an impact (Izod) strength of at least 2500 J/m.

20. A fibrous self-reinforced composite (SRC) material according to claim 1, wherein the matrix phase comprises material melted from the first oriented polymeric ductile fibre, and comprises 10-50% by weight of the thermoplastic polymer in the fibrous self-reinforced composite material.

21. A fibrous self-reinforced composite (SRC) material according to claim 1, wherein said first oriented polymeric ductile fibre has a diameter of 0.005 to 0.05 mm.

* * * * *